United States Patent
Watanabe et al.

(10) Patent No.: US 6,180,287 B1
(45) Date of Patent: Jan. 30, 2001

(54) POLYETHER COPOLYMER AND SOLID POLYMER ELECTROLYTE

(75) Inventors: Masayoshi Watanabe, Kanagawa; Katsuhito Miura, Hyogo; Masanori Yanagida, Hyogo; Hiroki Higobashi, Hyogo; Takahiro Endo, Hyogo, all of (JP)

(73) Assignee: Daiso Co., Ltd., Osaka (JP)

( * ) Notice: Under 35 U.S.C. 154(b), the term of this patent shall be extended for 0 days.

(21) Appl. No.: 09/101,971

(22) PCT Filed: Dec. 8, 1997

(86) PCT No.: PCT/JP97/04499

§ 371 Date: Jul. 30, 1998

§ 102(e) Date: Jul. 30, 1998

(87) PCT Pub. No.: WO98/25990

PCT Pub. Date: Jun. 18, 1998

(30) Foreign Application Priority Data

Dec. 9, 1996 (JP) .................................... 8-328422
Dec. 25, 1996 (JP) .................................... 8-345244

(51) Int. Cl.[7] ........................... H01M 6/18; C08G 65/08; C08G 65/14
(52) U.S. Cl. .................... 429/312; 429/309; 429/313; 429/316
(58) Field of Search .................. 429/309, 311, 429/312, 317, 313, 316

(56) References Cited

U.S. PATENT DOCUMENTS

| | | |
|---|---|---|
| 3,297,783 | 1/1967 | Bailey, Jr. .......................... 260/836 |
| 4,303,748 | 12/1981 | Armand et al. . |
| 4,578,326 | 3/1986 | Armand et al. . |
| 4,758,483 | 7/1988 | Armand et al. . |
| 4,818,644 | 4/1989 | Armand . |
| 4,822,701 | 4/1989 | Ballard et al. . |
| 5,162,174 | 11/1992 | Andrei et al. . |
| 5,527,639 | 6/1996 | Noda et al. . |

FOREIGN PATENT DOCUMENTS

| | | |
|---|---|---|
| 0 174 894 | 3/1986 | (EP) . |
| 0 222 586 | 5/1987 | (EP) . |
| 331 342 | 9/1989 | (EP) . |
| 0 392 839 | 10/1990 | (EP) . |
| 392 839 | 10/1990 | (EP) . |
| 742 563 | 11/1996 | (EP) . |
| 838 487 A2 * | 4/1998 | (EP) ........................ C08G/65/08 |
| 62-169823 | 7/1987 | (JP) . |
| 62-249361 | 10/1987 | (JP) . |
| 63-154736 | 6/1988 | (JP) . |
| 2-235957 | 9/1990 | (JP) . |
| 2-295004 | 12/1990 | (JP) . |
| 3-47833 | 2/1991 | (JP) . |
| 4-68064 | 3/1992 | (JP) . |
| 5-304051 | 11/1993 | (JP) . |

OTHER PUBLICATIONS

Patent Abstracts of Japan, JP 04–036347 (Feb. 6, 1992).
Patent Abstracts of Japan, JP 03–200864 (Sep 2, 1991).
Patent Abstracts of Japan, JP 03–200865 (Sep 2, 1991).
Ballard, D., et al., "Ionic Conductivity in Organic Solids Derived from Amorphous Macromolecules," Macromolecules, vol. 23, pp. 1256–1264 (1990).
Kono, M., "Synthesis of Polymer Electrolytes Based on Poly[2–(2–methoxyethoxy)ethyl glycidyl ether] and Their High Ionic Conductivity," Polymers for Advanced Technologies, vol. 4, pp. 85–91, (1993).
Motogami, K., et al., "A New Polymer Electrolyte Based on Polyglycidylether," Electrochimica Acta, vol. 37, No. 9, pp. 1725–1727 (1992).

* cited by examiner

*Primary Examiner*—Maria Nuzzolillo
*Assistant Examiner*—Tracy Dove
(74) *Attorney, Agent, or Firm*—Foley & Lardner

(57) ABSTRACT

A solid polymer electrolyte obtained by blending (1) a polyether copolymer having a main chain, which is derived form ethylene oxide, and a side chain having two oligooxyethylene groups, (2) an electrolyte salt compound, and, if necessary, (3) a plasticizer which is any one of an aprotic organic solvent or a derivative or metal salt of a polyalkylene glycol having a number-average molecular weight of 200 to 5,000 or a metal salt of the derivative, is superior in ionic conductivity and also superior in processability, moldability and mechanical strength to a conventional solid electrolyte. A secondary battery is constructed by using the solid polymer electrolyte in combination with a lithium metal negative electrode and a lithium cobaltate positive electrode.

35 Claims, No Drawings

POLYETHER COPOLYMER AND SOLID POLYMER ELECTROLYTE

FIELD OF THE INVENTION

The present invention relates to a polyether copolymer and a solid polymer electrolyte. More particularly, it relates to a solid polymer electrolyte which is suitable as a material for an electrochemical device such as a battery, a capacitor and a sensor.

RELATED ART

As an electrolyte constituting an electrochemical device such as a battery, a capacitor and a sensor, those in the form of a solution or a paste have hitherto been used in view of the ionic conductivity. However, the following problems are pointed out. That is, there is a fear of damage of an apparatus arising due to liquid leakage, and subminiaturization and thinning of the device are limited because a separator to be impregnated with an electrolyte solution is required. To the contrary, a solid electrolyte such as inorganic crystalline substance, inorganic glass and organic polymer substance is suggested. The organic polymer substance is generally superior in processability and moldability and the resulting solid electrolyte has good flexibility and bending processability and, furthermore, the design freedom of the device to be applied is high and, therefore, the development is expected. However, the organic polymer substance is inferior in ionic conductivity to other materials at present. For example, a trial of containing a specific alkaline metal salt in a mixture of an epichlorohydrin rubber and a low-molecular weight polyethylene glycol derivative and applying the resultant to a solid polymer electrolyte is suggested in Japanese Patent Kokai Publication No. 235957/1990 including the present applicant, but a practically sufficient conductivity value is not still obtained. Furthermore, a solid polymer electrolyte prepared by crosslinking a polymeric compound which has been described in Japanese Patent Kokai Publication Nos. 47833/1991 and 68064/1992 shows a comparatively good ionic conductivity within the practical temperature range, but those having more excellent mechanical characteristics and ionic conductivity are required.

SUMMARY OF THE INVENTION

An object of the present invention provides a solid electrolyte which is superior mechanical properties and ionic conductivity.

The present invention provides a polyether copolymer having a weight-average molecular weight of $10^3$ to $10^7$, which is optionally crosslinked, comprising:

(A) 0.5 to 99% by mol of a repeating unit derived from a monomer represented by the formula (I):

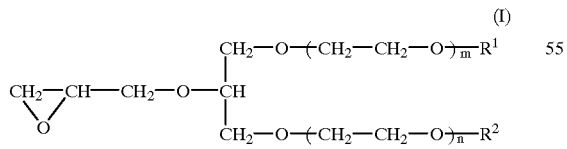

(I)

wherein each of $R^1$ and $R^2$ represents a group selected from an alkyl group having 1 to 12 carbon atoms, an alkenyl group having 2 to 8 carbon atoms, a cycloalkyl group having 3 to 8 carbon atoms, an aryl group having 6 to 14 carbon atoms, an aralkyl group having 7 to 12 carbon atom and a tetrahydropyranyl group; and each of m and n represents numeral of 1 to 12;

(B) 99.5 to 1% by mol of a repeating unit derived from a monomer represented by the formula (II):

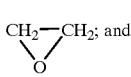

(II)

(C) 0 to 15% by mol of a repeating unit derived from a monomer having one epoxy group and at least one reactive functional group.

The present invention provides a solid polymer electrolyte comprising:

(1) the above polyether copolymer, (2) an electrolyte salt compound, and, (3) if necessary, a plasticizer selected from the group consisting of an aprotic organic solvent, and a derivative or metal salt of a linear or branched polyalkylene glycol having a number-average molecular weight of 200 to 5,000 or a metal salt of said derivative.

The present invention also provides a battery comprising the above solid polymer electrolyte.

A crosslinked material of the polyether copolymer is used when the shape stability at high temperature is required.

When the plasticizer is blended with the solid polymer electrolyte, the crystallization of the polymer is inhibited and the glass transition temperature is lowered and a large amount of an amorphous phase is formed even at low temperature and, therefore, the ionic conductivity is improved. It has been also found that, when the solid polymer electrolyte of the present invention is used, a high-performance battery having small internal resistance can be obtained. The solid polymer electrolyte of the present invention may be in the form of a gel. The term "gel" used herein means a polymer swollen with a solvent.

DETAILED DESCRIPTION OF THE INVENTION

The repeating unit (C) may be derived from a monomer of the formula (III-1) or (III-2):

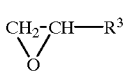

(III-1)

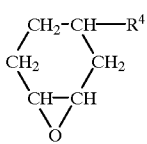

(III-2)

wherein $R^3$ and $R^4$ represent a reactive functional group-containing group.

The polyether polymer of the present invention comprises (A) a repeating unit derived from a monomer (I):

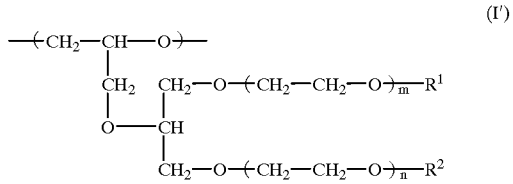

(I')

wherein each of $R^1$ and $R^2$ is a group selected from an alkyl group having 1 to 12 carbon atoms, an alkenyl group having 2 to 8 carbon atoms, a cycloalkyl group having 3 to 8 carbon atoms, an aryl group having 6 to 14 carbon atoms, an aralkyl group having 7 to 12 carbon atoms and a tetrahydropyranyl group; and each of m and n is a numeral of 1 to 12, and (B) a repeating unit derived from a monomer (II):

(II')

The polyether copolymer optionally comprises (C) a repeating unit derived from a monomer having one epoxy group and at least one reactive functional group. A crosslinked material can be derived from the polyether copolymer having the repeating unit (C) by utilizing the reactivity of the reactive functional group.

The copolymer used in the present invention may be crosslinked or not crosslinked. Examples of a crosslinking agent for crosslinking a binary copolymer having the repeating unit (I') and the repeating unit (II') specifically include isocyanate compounds such as 2,4-tolylene diisocyanate, 2,6-tolylene diisocyanate, 4,4-diphenylmethane diisocyanate and hexamethylene diisocyanate.

The repeating unit (C) derived from a monomer of the formula (III-1) or (III-2) is represented by the formula (III'-1) or (III'-2):

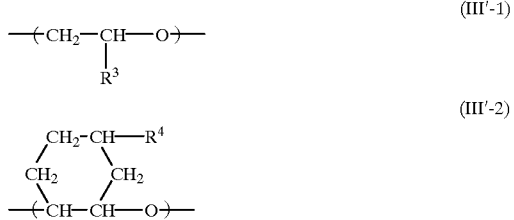

wherein $R^3$ and $R^4$ represent a reactive functional group-containing group.

The reactive functional group in the repeating unit (C) is preferably (a) a reactive silicon group, (b) an epoxy group, (c) an ethylenically unsaturated group, or (d) a halogen atom.

The polymerization method of the polyether copolymer, which may have a crosslinkable side chain, of the present invention is the polymerization method wherein a copolymer is obtained by a ring opening reaction of ethylene oxide portion and can be conducted in the same manner as that described in Japanese Patent Kokai Publication Nos. 154736/1988 and 169823/1987 filed by the present applicant.

The polymerization reaction can be conducted as follows. That is, the polyether copolymer can be obtained by reacting the respective monomers at the reaction temperature of 10 to 80° C. under stirring, using a catalyst mainly containing an organoaluminum, a catalyst mainly containing an organozinc, an organotin-phosphate ester condensate catalyst and the like as a ring opening polymerization catalyst in the presence or absence of a solvent. Among of them, the organotin-phosphate ester condensate catalyst is particularly preferable in view of the polymerization degree, or properties of the resulting copolymer and the like. In the polymerization reaction, the reactive functional group does not react so that a copolymer having the reaction functional group is obtained. When an oxirane compound having an epoxy group at only the both ends is used, an only epoxy group containing no substituent such as no methyl group is used for polymerization and an epoxy group containing a methyl group remains in the polymer without any reaction.

In the polyether copolymer of the present invention, the content of the repeating unit (A) is from 0.5 to 99% by mol, e.g. from 3 to 99% by mol, particularly from 10 to 95% by mol, and especially from 10 to 80% by mol; the content of the repeating unit (B) is from 99.5 to 1% by mol, e.g. from 95 to 1% by mol, particularly from 90 to 5% by mol, and specifically from 80 to 5% by mol; and the content of the repeating unit (C) is from 0 to 15% by mol, e.g. 0 to 10% by mol, preferably from 0 to 5% by mol, and particularly 0.001 to 5% by mol. When the content of the repeating unit (B) exceeds 99.5% by mol, an increase in glass transition temperature and crystallization of the oxyethylene chain arise, which results in drastic deterioration of the ionic conductivity of the solid electrolyte. It is generally known that the ionic conductivity is improved by the decrease of the crystallizability of polyethylene oxide. It has been found that, in case of the polyether copolymer of the present invention, the effect for improvement of the ionic conductivity is remarkably large.

With respect to the molecular weight of the polyether copolymer, the weight-average molecular weight is suitable within the range from $10^3$ to $10^7$, and preferably from $10^4$ to $5 \times 10^6$, so as to obtain excellent processability, moldability, mechanical strength and flexibility. More preferably it is from $5 \times 10^4$ to $5 \times 10^6$, particularly from $10^5$ to $5 \times 10^6$.

A glass transition temperature and a fusion heat of the polyether copolymer are measured by a differential scanning calorimeter (DSC). In the present invention, the glass transition temperature of the polyether copolymer is preferably not more than −60° C., more preferably not more than −63° C., e.g. not more than −65° C. The fusion heat of the polyether copolymer is preferably not more than 90 J/g, e.g. not more than 70 J/g, specifically not more than 60 J/g, particularly not more than 50 J/g.

The polyether copolymer of the present invention may be any copolymer type such as a block copolymer and a random copolymer, but the random copolymer is preferable because the effect for reduction of the crystalizability of polyethylene oxide is large. The polyether copolymer of the present invention is a polyether copolymer having a side chain with two oligooxyethylene groups and, if necessary, a side chain containing a crosslinkable reactive functional group. The polyether copolymer of the present invention is a copolymer formed from at least two monomers.

The polymerization degrees m and n of the oxyethylene unit of the side chain portion in the monomer (I), which constitutes the repeating unit (A), are from 1 to 12, e.g. from 1 to 6, respectively. When the polymerization degree n exceeds 12, the ionic conductivity of the resulting solid polymer electrolyte is unfavorably deteriorated. When $R^1$ or $R^2$ represents an alkyl group, the preferable carbon number of the alkyl group is from 1 to 6, particularly from 1 to 3. When $R^1$ or $R^2$ represents an alkenyl group, the preferable carbon number of the alkenyl group is from 2 to 6, particularly from 2 to 4. In the monomer (I), $R^1$ and $R^2$ may be a methyl group, an ethyl group, a propyl group, a butyl group, a pentyl group, a hexyl group, an allyl group or a cyclohexyl group.

The monomer having a reactive silicon group, which constitutes the repeating unit (C), is preferably represented by the formula (III-a-1):

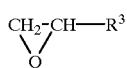
(III-a-1)

wherein $R^3$ is a reactive silicon-containing group, or the formula (III-a-2):

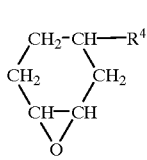
(III-a-2)

wherein $R^4$ is a reactive silicon-containing group.

The reactive silicon group-containing monomer represented by the formula (III-a-1) is preferably a compound represented by the formula (III-a-1-1) or (III-a-1-2).

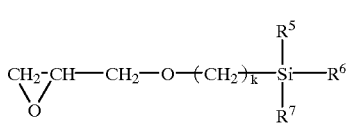
(III-a-1-1)

(III-a-1-2)

The reactive silicon group-containing monomer represented by the formula (III-a-2) is preferably a compound represented by the formula (III-a-2-1).

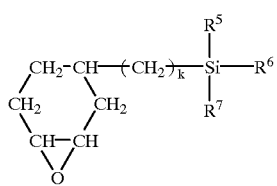
(III-a-2-1)

In the formulas (III-a-1-1), (III-a-1-2) and (III-a-2-1), $R^5$, $R^6$ and $R^7$ may be the same or different, but at least one of them represents an alkoxy group and the remainder represent an alkyl group; and k represents 1 to 6.

Examples of the monomer represented by the formula (III-a-1-1) include 1-glycidoxymethyltrimethoxysilane, 1-glycidoxymethylmethyldimethoxysilane, 2-glycidoxyethyltrimethoxysilane, 2-glycidoxyethylmethyldimethoxysilane, 3-glycidoxypropylmethyldimethoxysilane, 3-glycidoxypropyltrimethoxysilane, 4-glycidoxybutylmethyldimethoxysilane, 4-glycidoxybutylmethyltrimethoxysilane, 6-glycidoxyhexylmethyldimethoxysilane and 6-glycidoxyhexylmethyltrimethoxysilane.

Examples of the monomer represented by the formula (III-a-1-2) include 3-(1,2-epoxy)propyltrimethoxysilane, 3-(1,2-epoxy)propylmethyldimethoxysilane, 3-(1,2-epoxy)propyldimethylmethoxysilane, 4-(1,2-epoxy)butyltrimethoxysilane, 4-(1,2-epoxy)butylmethyldimethoxysilane, 5-(1,2-epoxy)pentyltrimethoxysilane, 5-(1,2-epoxy)pentylmethyldimethoxysilane, 6-(1,2-epoxy)hexyltrimethoxysilane and 6-(1,2-epoxy)hexylmethyldimethoxysilane.

Examples of the monomer represented by the formula (III-a-2-1) include 1-(3,4-epoxycyclohexyl)methyltrimethoxysilane, 1-(3,4-epoxycyclohexyl)methylmethyldimethoxysilane, 2-(3,4-epoxycyclohexyl)ethyltrimethoxysilane, 2-(3,4-epoxycyclohexyl)ethylmethyldimethoxysilane, 3-(3,4-epoxycyclohexyl)propyltrimethoxysilane, 3-(3,4-epoxycyclohexyl)propylmethyldimethoxysilane, 4-(3,4-epoxycyclohexyl)butyltrimethoxysilane and 4-(3,4-epoxycyclohexyl)butylmethyldimethoxysilane.

Among them, 3-glycidoxypropyltrimethoxysilane, 3-glycidoxypropylmethyldimethoxysilane, 4-(1,2-epoxy)butyltrimethoxysilane, 5-(1,2-epoxy)pentyltrimethoxysilane and 2-(3,4-epoxycyclohexyl)ethyltrimethoxysilane are particularly preferable.

The monomer having two epoxy groups, which constitutes the repeating unit (C), is preferably represented by the formula (III-b):

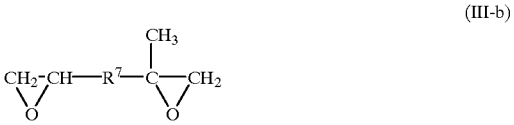
(III-b)

wherein $R^7$ is a divalent organic group. The monomer having two epoxy groups preferably has an epoxy groups at the both ends. $R^7$ is preferably an organic group comprising elements selected from hydrogen, carbon and oxygen.

It is preferable that the group $R^7$ in the formula (III-b) is

—CH$_2$—O—(CHA$^1$—CHA$^2$—O)$_m$—CH$_2$—,

—(CH$_2$)$_m$—, or

—CH$_2$O—Ph—OCH$_2$— wherein $A^1$ and $A^2$ represent hydrogen or a methyl group; Ph represents a phenylene group; and m represents a numeral of 0 to 12.

The monomer having two epoxy groups is preferably a compound represented

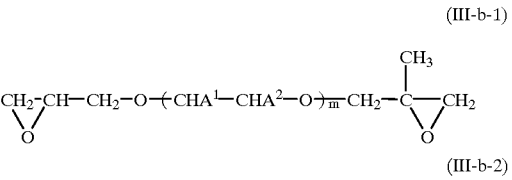
(III-b-1)

(III-b-2)

by the following formula (III-b-1), (III-b-2) or (III-b-3):

In the above formulas (III-b-1), (III-b-2) and (III-b-3), $A^1$ and $A^2$ represent hydrogen or a methyl group; and m represents a numeral of 0 to 12.

Examples of the monomer represented by the formula (III-b-1) include 2,3-epoxypropyl-2',3'-epoxy-2'-methyl propyl ether, ethylene glycol-2,3-epoxypropyl-2',

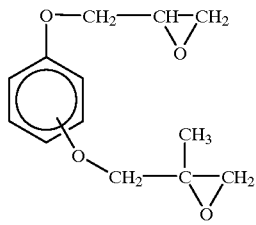

(III-b-3)

3'-epoxy-2'-methyl propyl ether, and diethylene glycol-2,3-epoxypropyl-2',3'-epoxy-2'-methyl propyl ether. Examples of the monomer represented by the formula (III-b-2) include 2-methyl-1,2,3,4-diepoxybutane, 2-methyl-1,2,4,5-diepoxypenatane, and 2-methyl-1,2,5,6-diepoxyhexane. Examples of the monomer represented by the formula (III-b-3) include hydroquinone-2,3-epoxypropyl-2',3'-epoxy-2'-methyl propyl ether, and catechol-2,3-epoxypropyl-2',3'-epoxy-2'-methyl propyl ether.

Among them, 2,3-epoxypropyl-2',3'-epoxy-2'-methyl propyl ether and ethylene glycol-2,3-epoxypropyl-2',3'-epoxy-2'-methyl propyl ether are particularly preferable.

The monomer having the ethylenically unsaturated group, which constitutes the repeating unit (C), is preferably represented by the formula (III-c):

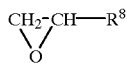

(III-c)

wherein $R^8$ is a group having an ethylenically unsaturated group.

As the ethylenically unsaturated group-containing monomer, there can be used allyl glycidyl ether, 4-vinylcyclohexyl glycidyl ether, α-terpinyl glycidyl ether, cyclohexenylmethyl glycidyl ether, p-vinylbenzyl glycidyl ether, allylphenyl glycidyl ether, vinyl glycidyl ether, 3,4-epoxy-1-butene, 3,4-epoxy-1-pentene, 4,5-epoxy-2-pentene, 1,2-epoxy-5,9-cyclododecadiene, 3,4-epoxy-1-vinylcyclohexene, 1,2-epoxy-5-cyclooctene, glycidyl acrylate, glycidyl methacrylate, glycidyl sorbate, glycidyl cinnamate, glycidyl crotonate, glycidyl-4-hexenoate, oligoethylene glycol glycidyl ether acrylate having 1 to 12 oxyethylene chains, oligoethylene glycol glycidyl ether methacrylate having 1 to 12 oxyethylene chains, oligoethylene glycol allyl glycidyl ether having 1 to 12 oxyethylene chains or

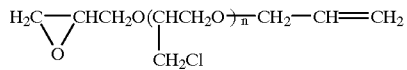

(n = 1–12).

Preferable examples thereof include allyl glycidyl ether, glycidyl acrylate and glycidyl methacrylate.

The monomer (C) having a halogen atom is preferably represented by the formula (III-d):

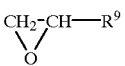

(III-d)

wherein $R^9$ is a group having at least one halogen atom. $R^9$ may be, e.g. an alkyl group substituted with a halogen atom.

Examples of the monomer having a halogen atom include:

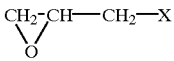

wherein X is a halogen atom, particularly a bromine atom (Br) or an iodine atom (I). Examples of the monomer having a halogen atom include epibromohydrin and epiiodohydrin.

As the crosslinking method of the copolymer wherein the reactive functional group is a reactive silicon group, the crosslinking can be conducted by the reaction between the reactive silicon group and water. In order to increase the reactivity, there may be used, as a catalyst, organometal compounds, for example, tin compounds such as dibutyltin dilaurate, dibutyltin maleate, dibutyltin diacetate, tin octylate and dibutyltin acetylacetonate; titanium compounds such as tetrabutyl titanate and tetrapropyl titanate; aluminum compounds such as aluminum trisacetyl acetonate, aluminum trisethyl acetoacetate and diisopropoxyaluminum ethylacetoacetate; or amine compounds such as butylamine, octylamine, laurylamine, dibutylamine, monoethanolamine, diethanolamine, triethanolamine, diethylenetriamine, trietylenetetraamine, cyclohexylamine, benzylamine, diethylaminopropylamine, guanine and diphenylguanine.

As the crosslinking method of the copolymer wherein the reactive functional group is an epoxy group, polyamines, acid anhydrides and the like can be used.

Examples of the polyamines include aliphatic polyamines such as diethylenetriamine, dipropylenetriamine, triethylenetetramine, tetraethylenepentamine, dimethylaminopropylamine, diethylaminopropylamine, dibutylaminopropylamine, hexamethylenediamine, N-aminoethylpiperazine, bis-aminopropylpiperazine, trimethylhexamethylenediamine and dihydrazide isophthalate; and aromatic polyamines such as 4,4'-diaminodiphenyl ether, diaminodiphenyl sulfone, m-phenylenediamine, 2,4-toluylenediamine, m-toluylenediamine, o-toluylenediamine and xylylenediamine. The amount of the polyamine varies depending on the type of the polyamine, but is normally within the range from 0.1 to 10% by weight based on the whole composition excluding a plasticizer (that is, a composition excluding a plasticizer from a solid electrolyte).

Examples of the acid anhydrides includes maleic anhydride, dodecenylsuccinic anhydride, chlorendic anhydride, phthalic anhydride, pyromellitic anhydride, hexahydrophthalic anhydride, methylhexahydrophthalic anhydride, tetramethylenemaleic anhydride, tetrahydrophthalic anhydride, methyltetrahydrophthalic anhydride and trimellitic anhydride. The amount of the acid anhydrides varies depending on the type of the acid anhydride, but is normally within the range from 0.1 to 10% by weight based on the whole composition excluding a plasticizer. In the crosslinking, an accelerator can be used. In the crosslinking reaction of polyamines, the accelerator include phenol, cresol, resorcin, pyrogallol, nonyl phenol and 2,4,6-tris (dimethylaminomethyl)phenol. In the crosslinking reaction of the acid anhydride, the accelerator include benzyldimethylamine, 2,4,6-tris(dimethylaminomethyl)

phenol, 2-(dimethylaminoethyl)phenol, dimethylaniline and 2-ethyl-4-methylimidazole. The amount of the accelerator varies depending on the type of the accelerator, but is normally within the range from 0.1 to 10% by weight based on the crosslinking agent.

In the crosslinking method of the copolymer wherein the reactive functional group is ethylenically unsaturated group, a radical initiator selected from an organic peroxide and an azo compound, or active energy ray such as ultraviolet ray and electron ray can be used. It is also possible to use a crosslinking agent having a silicon hydride.

As the organic peroxide, there can be used those which are normally used in the crosslinking, such as a ketone peroxide, a peroxy ketal, a hydroperoxide, a dialkyl peroxide, a diacyl peroxide and a peroxy ester. Specific examples of the organic peroxide include methyl ethyl ketone peroxide, cyclohexanone peroxide, 1,1-bis(t-butylperoxy)-3,3,5-trimethylcyclohexane, 2,2-bis(t-butylperoxy)octane, n-butyl-4,4-bis(t-butylperoxy)valerate, t-butyl hydroperoxide, cumene hydroperoxide, 2,5-dimethylhexane-2,5-dihydroperoxide, di-t-butyl peroxide, t-butylcumyl peroxide, dicumyl peroxide, α,α'-bis(t-butylperoxy-m-isopropyl)benzene, 2,5-dimethyl-2,5-di(t-butylperoxy)hexane, 2,5-dimethyl-2,5-di(t-butylperoxy)hexene, benzoylperoxide and t-butylperoxyisopropylcarbonate. The amount of the organic peroxide varies depending on the type of the organic peroxide, but it is normally within the range from 0.1 to 10% by weight based on the whole composition excluding a plasticizer.

As the azo compound, there can be used those which are normally used in the crosslinking, such as an azonitrile compound, an azoamide compound and an azoamidine compound. Specific examples of the azo compound include 2,2'-azobisisobutyronitrile, 2,2'-azobis(2-methylbutyronitrile), 2,2'-azobis(4-methoxy-2,4-dimethylvaleronitrile), 2,2'-azobis(2,4-dimethylvaleronitrile), 1,1'-azobis(cyclohexane-1-carbonitrile), 2-(carbamoylazo)isobutyronitrile, 2-phenylazo-4-methoxy-2,4-dimethyl-valeronitrile, 2,2-azobis(2-methyl-N-phenylpropionamidine)dihydrochloride, 2,2'-azobis[N-(4-chlorophenyl)-2-methylpropionamidine]dihydrochloride, 2,2'-azobis[N-(hydroxyphenyl)-2-methylpropionamidine]dihydrochloride, 2,2'-azobis[2-methyl-N-(phenylmethly)propionamidine]dihydrochloride, 2,2'-azobis[2-methyl-N-(2-propenyl)propionamidine]dihydrochloride, 2,2'-azobis(2-methylpropionamidine)dihydrochloride, 2,2'-azobis[N-( 2-hydroxyethyl)-2-methylpropionamidine]dihydrochloride, 2,2'-azobis[2-(5-methyl-2-imidazolin-2-yl)propane]dihydrochloride, 2,2'-azobis[2-(2-imidazolin-2-yl)propane]dihyrochloride, 2,2'-azobis[2-(4,5,6,7-tetrahydro-1H-1,3-diazepin-2-yl)propane]dihydrochloride, 2,2'-azobis[2-(3,4,5,6-tetrahydropyrimidin-2-yl)propane]dihydrochloride, 2,2'-azobis[2-(5-hydroxy-3,4,5,6-tetrahydropyrimidin-2-yl)propane]dihydrochloride, 2,2'-azobis{2-[1-(2-hydroxyethyl)-2-imidazolin-2-yl]propane}dihydrochloride, 2,2'-azobis[2-(2-imidazolin-2-yl)propane], 2,2'-azobis{2-methyl-N-[1,1-bis(hydroxymethyl)-2-hydroxyethyl]propionamide}, 2,2'-azobis{2-methyl-N-[1,1-bis(hydroxymethyl)ethyl]propionamide}, 2,2'-azobis[2-methyl-N-(2-hydroxyethyl)propionamide], 2,2'-azobis(2-methylpropionamide)dihydrate, 2,2'-azobis(2,4,4-trimethylpentane), 2,2'-azobis(2-methylpropane), dimethyl 2,2'-azobisisobutyrate, 4,4'-azobis(4-cyanovaleric acid) and 2,2'-azobis[2-(hydroxymethyl)propionitrile]. The amount of the azo compound varies depending on the type of the azo compound, but is normally within the range from 0.1 to 10% by weight based on the whole composition excluding a plasticizer.

In the crosslinking due to radiation of activated energy ray such as ultraviolet ray, glycidyl acrylate ester, glycidyl methacrylate ester and glycidyl cinnamate ester are particularly preferable among the monomer component represented by the formula (III-c). Furthermore, as the auxiliary sensitizer, there can be optionally used acetophenones such as diethoxyacetophenone, 2-hydroxy-2-methyl-1-phenylpropan-1-one, benzyldimethylketal, 1-(4-isopropylphenyl)-2-hydroxy-2-methylpropan-1-one, 4-(2-hydroxyethoxy)phenyl-(2-hydroxy-2-propyl)ketone, 2,2-dimethoxy-1,2-diphenylethan-1-one, 1-hydroxycyclohexyl-phenylketone and 2-methyl-2-morpholino(4-thiomethylphenyl)propan-1-one; benzoin ethers such as benzoin, benzoin methyl ether, benzoin ethyl ether, benzoin isopropyl ether and benzoin isobutyl ether; benzophenones such as benzophenone, methyl o-benzoyl benzoate, 4-phenylbenzophenone, hydroxybenzophenone, 4-benzoyl-4'-methyl-diphenyl sulfide, alkylated benzophenone, 3,3',4,4'-tetra(t-butylperoxycarbonyl)benzophenone, 4-benzoyl-N,N-dimethyl-N-[2-(1-oxo-2-propenyloxy)ethyl] benzenemethanaminium bromide and (4-benzoylbenzyl) trimethylammonium chloride; thioxanthones such as 2-isopropylthioxanthone, 2,4-dimethylthioxanthone, 2,4-diethylthioxanthone and 2,4-dichlorothioxanthone; azides such as azidopyrene, 3-sulfonylazidobenzoic acid, 4-sulfonylazidobenzoic acid, 2,6-bis(4'-azidobenzal) cyclohexanone-2,2'-disulfonic acid (sodium salt), p-azidobenzaldehyde, p-azidoacetophenone, p-azidobenzoinic acid, p-azidobenzalacetophenone, p-azidobenzalacetone, 4,4'-diazidochalcone, 1,3-bis(4'-azidobenzal)acetone, 2,6-bis(4'-azidobenzal) cyclohexanone, 2,6-bis(4-azidobenzal) 4-methylcyclohexanone, 4,4'-diazidostilbene-2,2'-disulfonic acid, 1,3-bis(4'-azidobenzal)-2-propanone-2'-sulfonic acid and 1,3-bis(4'-azidocinnacylidene)-2-propanone.

As a crosslinking aid,there can be optionally used ethylene glycol diacrylate, ethylene glycol dimethacrylate, oligoethylene glycol diacrylate, oligoethylene glycol dimethacrylate, propylene glycol diacrylate, propylene glycol dimethacrylate, oligopropylene glycol diacrylate, oligopropylene glycol dimethacrylate, 1,3-butylene glycol diacrylate, 1,4-butylene glycol diacrylate, 1,3-glycerol dimethacrylate, 1,1,1-trimethylolpropane dimethacrylate, 1,1,1-trimethylolethane diacrylate, pentaerythritol trimethacrylate, 1,2,6-hexanetriacrylate, sorbitol pentamethacrylate, methylenebisacrylamide, methylenebismethacrylamide divinyl benzene, vinyl methacrylate, vinyl crotonate, vinyl acrylate, vinyl acetylene, trivinyl benzene, triallyl cyanyl sulfide, divinyl ether, divinyl sulfo ether, diallyl phthalate, glycerol trivinyl ether, allyl methacrylate, allyl acrylate, diallyl maleate, diallyl fumarate, diallyl itaconate, methyl methacrylate, butyl acrylate, ethyl acrylate, 2-ethylhexyl acrylate, lauryl methacrylate, ethylene glycol acrylate, triallyl isocyanurate, maleimide, phenylmaleimide, p-quinonedioxime, maleic anhydride and itaconic acid.

As the compound having a silicon hydride group, which is used for crosslinking the ethylenically unsaturated group, a compound having at least two silicon hydride groups can be used. Particularly, a polysiloxane compound or a polysilane compound is preferable.

Examples of the polysiloxane compound include a linear polysiloxane compound represented by the formula (a-1) or (a-2), or a cyclic polysiloxane compound represented by the formula (a-3).

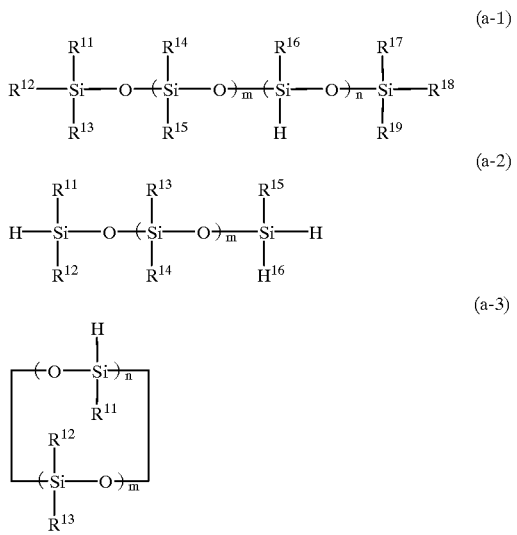

In the formulas (a-1) to (a-3), $R^{11}, R^{12}, R^{13}, R^{14}, R^{15}, R^{16}, R^{17}, R^{18}$ and $R^{19}$ respectively represent a hydrogen atom or an alkyl or alkoxy group having 1 to 12 carbon atoms; and $n \geq 2$, $m \geq 0$, $2 \leq m+n \leq 300$. As the alkyl group, a lower alkyl group such as a methyl group and an ethyl group is preferable. As the alkoxy group, a lower alkoxy group such as a methoxy group and an ethoxy group is preferable.

As the polysilane compound, a linear polysilane compound represented by the formula (b-1) can be used.

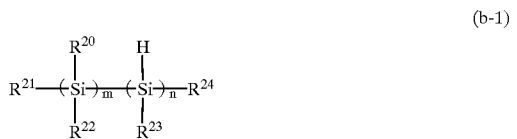

In the formula (b-1), $R^{20}$, $R^{21}$, $R^{22}$, $R^{23}$ and $R^{24}$ respectively represent a hydrogen atom or an alkyl or alkoxy group having 1 to 12 carbon atoms; and $n \geq 2$, $m \geq 0$, $2 \leq m+n \leq 100$.

Examples of the catalyst of the hydrosilylation reaction include transition metals such as palladium and platinum or a compound or complex thereof. Furthermore, peroxide, amine and phosphine can also be used. The most popular catalyst includes dichlorobis(acetonitrile)palladium(II), chlorotris(triphenylphosphine)rhodium(I) and chloroplatinic acid.

In the crosslinking method of the copolymer containing a halogen atom (e.g. a bromine atom or a iodine atom), for example, a crosslinking agent such as polyamines, mercaptoimidazolines, mercaptopyrimidines, thioureas and polymercaptanes can be used. Examples of the polyamines include hexamethylenediamine carbamate, triethylenetetramine, tetraethylenepentamine, ethylenediamine carbamate, diethylenetriamine, dipropylenetriamine, dimethylaminopropylamine, diethylaminopropylamine, dibutylaminopropylamine, hexamethylenediamine, trimethylhexamethylenediamine, diaminophenyl sulfone, m-phenylenediamine, 2,4-toluylenediamine, m-toluylenediamine, o-toluylenediamine and xylylenediamine. Examples of the mercaptoimidazolines include 2-mercaptoimidazoline, 4-methyl-2-mercaptoimidazoline and 5-ethyl-4-butyl-2-mercaptoimidazoline. Examples of the mercaptopyrimidines include 2-mercaptopyrimidine, 4,6-dimethyl- 2-mercaptopyrimidine, and 5-butyl-2-mercaptopyrimidine. Examples of the thioureas include thiourea, ethylene thiourea, dibutyl thiourea, trimethyl thiourea, triethyl thiourea and tributyl thiourea. Examples of the polymercaptanes include 2-dibutylamino-4,6-dimethylcapto-s-triazine, 2-phenylamino-4,6-dimercaptotriazine, 2,5-dimercapto-1,3,4-thiazole, 1,10-decanedithiol, 2,3-dimercaptopyrazine, 2,3-dimercaptoquinoxaline and 6-methylquinoxaline-2,3-dithiocarbonate. The amount of the crosslinking agent varies depending on the type of the crosslinking agent, but is normally within the range from 0.1 to 30% by weight based on the whole composition excluding a plasticizer.

Furthermore, it is effective to add a metal compound as an acid acceptor to the solid polymer electrolyte in view of the thermal stability of the halogen-containing polymer. Examples of the metal oxide as the acid acceptor include oxide, hydroxide, carbonate salt, carboxylate salt, silicate salt, borate salt and phosphite salt of Group II metal of the periodic table; and oxide, basic carbonate salt, basic carboxylate salt, basic phosphite salt, basic sulfite salt and tribasic sulfate salt of Group VIa metal of the periodic table. Specific examples thereof include magnesia, magnesium hydroxide, barium hydroxide, magnesium carbonate, barium carbonate, quick lime, slaked lime, calcium carbonate, calcium silicate, calcium stearate, zinc stearate, calcium phthalate, magnesium phosphite, calcium phosphite, zinc white, tin oxide, litharge, read lead, white lead, dibasic lead phthalate, dibasic lead carbonate, tin stearate, basic lead phosphite, basic tin phosphite, basic lead sulfite and tribasic lead sulfate. The amount of the metal compound as the above acid acceptor varies depending on the type thereof, but is formally within the range from 0.1 to 30% by weight based on the whole composition excluding a plasticizer.

The electrolyte salt compound used in the present invention is preferably soluble in a mixture comprising a polyether copolymer or a crosslinked material of the copolymer and a plasticizer. In the present invention, the following salt compounds are preferably used.

That is, examples thereof include a compound composed of a cation selected from a metal cation, ammonium ion, amidinium ion and guanidium ion, and an anion selected from chloride ion, bromide ion, iodide ion, perchlorate ion, thiocyanate ion, tetrafluoroborate ion, nitrate ion, $AsF_6^-$, $PF_6^-$, stearylsulfonate ion, octylsulfonate ion, dodecylbenzenesulfonate ion, naphthalenesufonate ion, dodecylnaphthalenesulfonate ion, 7,7,8,8-tetracyano-p-quinodimethane ion, $X^1SO_3^-$, $[(X^1SO_2)(X^2SO_2)N]^-$, $[(X^1SO_2)(X^2SO_2)(X^3SO_2)C]^-$ and $[(X^1SO_2)(X^2SO_2)YC]^-$, wherein $X^1$, $X^2$, $X^3$ and Y respectively represent an electron attractive group. Preferably, $X^1$, $X^2$ and $X^3$ independently represent a perfluoroalkyl having 1 to 6 carbon atoms or a perfluoroaryl group and Y represents a nitro group, a nitroso group, a carbonyl group, a carboxyl group or a cyano group. $X^1$, $X^2$ and $X^3$ may be the same or different. As the metal cation, a cation of a transition metal can be used. Preferably, a cation of a metal selected from Mn, Fe, Co, Ni, Cu, Zn and Ag metals is used. When using a cation of a metal selected from Li, Na, K, Rb, Cs, Mg, Ca and Ba metals, good results are also obtained. Two or more compounds described above may be used as the electrolyte salt compound.

In the present invention, the amount of the electrolyte salt compound is so that a numeral value of a molar ratio of the number of moles of the electrolyte salt compound to the total number of moles of oxyethylene units (the total number of moles of oxyethylene units included in a main chain and side chain of the polyether copolymer) is preferably within the range from 0.0001 to 5, more preferably from 0.001 to 0.5. When this value exceeds 5, the processability and moldability, the mechanical strength and flexibility of the resulting solid electrolyte are deteriorated.

The plasticizer is an aprotic organic solvent, or a derivative or a metal salt of a linear or branched polyalkylene glycol having a number-average molecular weight of 200 to 5,000, or a metal salt of the derivative.

As the aprotic organic solvent, aprotic ethers and esters are preferable. Specific examples include propylene carbonate, γ-butyrolactone, butylene carbonate, ethylene carbonate, dimethyl carbonate, ethylmethyl carbonate, diethyl carbonate, 1,2-dimethoxyethane, 1,2-dimethoxypropane, 3-methyl-2-oxyazolidone, tetrahydrofuran, 2-methyltetrahydrofuran, 1,3-dioxolane, 4,4-methyl-1,3-dioxolane, tert-butyl ether, iso-butylether, 1,2-ethoxymethoxyethane, ethylene glycol dimethyl ether, ethylene glycol diethyl ether, triethylene glycol dimethyl ether, triethylene glycol diethyl ether, tetraethylene glycol dimethyl ether, tetraethylene glycol diethyl ether, ethylene glyme, ethylene diglyme, methyl tetraglyme, methyl triglyme, methyl diglyme, methyl formate, methyl acetate and methyl propionate and a mixture of two or more of them may be used. Particularly, propylene carbonate, y-butyrolactone, butylene carbonate and 3-methyl-2-oxyazoline are preferable. Triethylene glycol dimethyl ether, triethylene glycol diethyl ether, tetraethylene glycol dimethyl ether and tetraethylene glycol diethyl ether are also particularly preferable organic solvents.

The derivative or metal salt of the linear or branched polyalkylene glycol or the metal salt of the derivative can be obtained from a polyalkylene glycol having a number-average molecular weight of 200 to 5,000. Examples of the polyalkylene glycol include polyethylene glycol or polypropylene glycol, and examples of the derivative thereof include ester derivative or ether derivative having an alkyl group having 1 to 8 carbon atoms and an alkenyl group having 3 to 8 carbon atoms.

Among the derivatives, examples of the ether derivative include diethers such as dimethyl ether, diethyl ether, dipropyl ether and diallyl ether, and examples of the ester derivative include diesters such as polyalkylene glycol dimethacrylate ester (e.g. polyethylene glycol dimethacrylate ester), polyalkylene glycol diacetate ester (e.g. polyethylene glycol diacetate ester), and polyalkylene glycol diacrylate ester (e.g. polyethylene glycol diacrylate ester).

Examples of the metal salt include a sodium, lithium and dialkyl aluminum salt of polyalkylene glycol.

Examples of the metal salt of the derivative include sodium, lithium and dialkylaluminum salts (e.g. dioctylaluminum salt) of monoethers such as monomethyl ether, monoethyl ether, monopropyl ether, monobutyl ether, monohexyl ether, mono-2-ethyl-hexyl ether and monoallyl ether; and monoesters such as monoacetate ester, monoacrylate ester and monomethacrylate ester. Examples of the metal salt of polyalkylene glycol derivative include dioctylaluminum salt of polyethylene glycol monomethyl ether, dioctylaluminum salt of polyethylene glycol monoethyl ether and dioctylaluminum salt of polyethylene glycol monoallyl ether.

The number-average molecular weight of the polyalkylene glycol used is more preferably within the range from 200 to 2,000.

The formulating proportion of the plasticizer is optionally selected, but is from 0 to 2,000 parts by weight, preferably 1 to 2,000 parts by weight, e.g. 10 to 1,000 parts by weight, particularly from 10 to 500 parts by weight, based on 100 parts by weight of the polyether copolymer.

When the flame retardancy is required in using the solid polymer electrolyte, a flame retardant can be used. That is, an effective amount of those selected from a halide (such as a brominated epoxy compound, tetrabromobisphenol A and chlorinated paraffin), antimony trioxide, antimony pentaoxide, aluminum hydroxide, magnesium hydroxide, phosphate ester, polyphosphate salt and zinc borate as a flame retardant can be added.

The method for production of the solid polymer electrolyte of the present invention is not specifically limited, but the respective components may be mechanically mixed, normally. In case of the multicomponent-copolymer requiring the crosslinking, it is produced by a method such as mechanically mixing the respective components, followed by crosslinking. Alternatively, after crosslinking, the crosslinked copolymer may be impregnated by immersing in a plasticizer for a long time. As means for mechanically mixing, various kneaders, open rolls, extruders and the like can be optionally used.

In case that the reactive functional group is a reactive silicon group, the amount of water used in the crosslinking reaction is not specifically limited because the crosslinking reaction easily occurs even in the presence of moisture in the atmosphere. The crosslinking can also be conducted by passing through a cold water or hot water bath for a short time, or exposing to a steam atmosphere.

In case of the copolymer wherein the reactive functional group is an epoxy group-containing group, when using a polyamine or an acid anhydride, the crosslinking reaction is completed at the temperature of 10 to 200° C. within 10 minutes to 20 hours.

In case of the copolymer wherein the reactive functional group is an ethylenically unsaturated group, when using a radical initiator, the crosslinking reaction is completed at the temperature of 10 to 200° C. within 1 minutes to 20 hours. Furthermore, when using energy ray such as ultraviolet ray, a sensitizer is normally used. The crosslinking reaction is normally completed at the temperature of 10 to 150° C. within 0.1 seconds to 1 hour. In case of the crosslinking agent having a silicon hydride, the crosslinking reaction is completed at the temperature of 10 to 180° C. within 10 minutes to 10 hours.

The method of mixing the electrolyte salt compound and plasticizer with the polyether copolymer is not specifically limited, but examples thereof include a method of impregnating by immersing the polyether copolymer in an organic solvent containing the electrolyte salt compound and plasticizer for a long time, a method of mechanically mixing the electrolyte salt compound and plasticizer with the polyether copolymer, a method of dissolving the polyether copolymer and the electrolyte salt compound in the plasticizer, followed by mixing or a method of dissolving the polyether copolymer once in the other organic solvent, followed by mixing the plasticizer. When producing by using the organic solvent, various polar solvents such as tetrahydrofuran, acetone acetonitrile, dimethylformamide, dimethyl sulfoxide, dioxane, methyl ethyl ketone and methyl isobutyl ketone, may be used alone or in combination thereof.

The solid polymer electrolyte shown in the present invention is superior in mechanical strength and flexibility, and a large area thin-film shaped solid electrolyte can be easily obtained by utilizing the properties. For example, it is possible to make a battery comprising the solid polymer electrolyte of the present invention. In this case, examples of the positive electrode material include lithium-manganese double oxide, lithium cobaltate, vanadium pentaoxide, polyacene, polypyrene, polyaniline, polyphenylene, polyphenylene sulfide, polyphenylene oxide, polypyrrole, and polyfuran, polyazulene. Examples of the negative electrode material include an interlaminar compound prepared by occlusion of lithium between graphite or carbon layers, a lithium metal and a lithium-lead alloy. By utilizing the high ion conductivity, the crosslinked solid polymer electrolyte can also be used as a diaphragm of an ion electrode of the cation such as alkaline metal ion, Cu ion, Ca ion and Mg ion. The solid polymer electrolyte of the present invention is especially suitable as a material for electrochemical device (e.g. a battery, a capacitor and a sensor).

PREFERRED EMBODIMENTS OF THE INVENTION

The following Examples further illustrate the present invention in detail.

In the following Examples and Comparative examples, a monomer (glycidyl ether compound) of the formula (1) is as follows:

$$\begin{array}{c} CH_2-O+CH_2-CH_2-O\!\!\!+_m\!\!R^1 \\ | \\ CH_2\!\!-\!\!CH\!\!-\!\!CH_2\!\!-\!\!O\!\!-\!\!CH \\ \diagdown\!O\!\diagup \qquad \qquad | \\ CH_2-O+CH_2-CH_2-O\!\!\!+_n\!\!R^2 \end{array} \quad (1)$$

The monomer used in the Example was synthesized in two steps.

SYNTHESIS EXAMPLE 1 OF MONOMER
(Step 1)

To ethylene glycol monomethyl ether (86.4 g, 2.27 moles), ground caustic soda (16.7 g, 0.83 moles) was added by several portions and caustic soda was dissolved by heating to 80° C. Ethylene glycol glycidyl methyl ether (50 g, 0.76 moles) was then added dropwise. After the completion of the dropwise addition, the solution was stirred for 2 hours and then air-cooled at room temperature. The solution was neutralized with hydrochloric acid and a salt was deposited by adding acetone, followed by filtration. Low-boiling materials were removed under reduced pressure to obtain 67 g (yield 85%) of 1,3-bis(2-methoxyethoxy)-2-propanol.
(Step 2)

Epichlorohydrin (66.7 g, 0.72 moles) was charged and ground caustic soda (14.4 g, 0.36 moles) was added by several portions with stirring. To this solution, 1,3-bis(2-methoxyethoxy)-2-propanol (50 g, 0.24 moles) obtained in the step 1 was added dropwise and the reaction was conducted at 40° C. for 3 hours. After filtration, 33.2 g of the desired 2-glycidoxy-1,3-bis(2-methoxyethoxy)propane (yield 52%) was obtained by distilled under reduced pressure. The structure of the resulting product was confirmed by $^1$H NMR.

Measurement condition of $^1$H NMR: Solvent: $C_6D_6$, Internal standard: TMS,

Measurement temperature: 30° C.

The measurement results of $^1$H NMR: The following peaks corresponding to the structure of the formula (a) were observed.

δ:2.2 to 2.3(2H, m, a), δ2.9(1H, m, b), δ:3.1(6H, s, c), δ:3.2 to 3.6(14H, m, d), δ:3.7(1H, m, e).

The boiling point of the resulting monomer was 115° C. at 0.3 mmHg. This monomer was used in Examples 1 and 5.

$$\begin{array}{c} \qquad\qquad\qquad CH_2\!\!-\!\!O\!\!-\!\!CH_2\!\!-\!\!CH_2\!\!-\!\!O\!\!-\!\!CH_3 \\ \qquad\qquad\qquad | \qquad\qquad\quad d \qquad\qquad c \\ H_2C\!\!-\!\!CH\!\!-\!\!CH_2\!\!-\!\!O\!\!-\!\!C\!\!-\!\!H \\ \underline{a}\;\diagdown\!O\!\diagup\;\underline{b}\quad\underline{d}\qquad | \quad\underline{e} \\ \qquad\qquad\qquad CH_2\!\!-\!\!O\!\!-\!\!CH_2\!\!-\!\!CH_2\!\!-\!\!O\!\!-\!\!CH_3 \\ \qquad\qquad\qquad\quad d \qquad\qquad\qquad c \end{array} \quad (a)$$

SYNTHESIS EXAMPLE 2 OF MONOMER

Using the following ethers in place of A: ethylene glycol glycidyl methyl ether and B: ethylene glycol monomethyl ether of step 1 in Synthesis Example 1 of monomer, a monomer (1) was synthesized by conducting the same operation as that of step 1 in Synthesis Example 1 of monomer and reacting epichlorohydrin in the same manner as that of step 2 in Synthesis Example 1 of monomer.

Monomer (1):

$$\begin{array}{c} CH_2-O+CH_2-CH_2-O\!\!\!+_m\!\!R^1 \\ | \\ CH_2\!\!-\!\!CH\!\!-\!\!CH_2\!\!-\!\!O\!\!-\!\!CH \\ \diagdown\!O\!\diagup \qquad \qquad | \\ CH_2-O+CH_2-CH_2-O\!\!\!+_n\!\!R^2 \end{array} \quad (1)$$

Formula (1): $R^1=\!-C_2H_5$, $R^2=\!-CH_3$, m=1, n=2 (used in Example 2)

A: Ethylene glycol glycidyl ethyl ether

B: Diethylene glycol monomethyl ether

Formula (1): $R^1=\!-CH_3$, $R^2=\!-CH_3$, m=2, n=2 (used in Example 3)

A: Diethylene glycol glycidyl methyl ether

B: Diethylene glycol monomethyl ether

Formula (1): $R^1=\!-CH_3$, $R^2=\!-CH_3$, m=3, n=1 (used in Example 4)

A: Triethylene glycol glycidyl methyl ether

B: Ethylene glycol monomethyl ether

Formula (1): $R^1=\!-CH_3$, $R^2=\!-CH_3$, m=1, n=2 (used in Example 6)

A: Ethylene glycol glycidyl methyl ether

B: Diethylene glycol monomethyl ether

Formula (1): $R^1=\!-CH_2\!-\!CH\!=\!CH_2$, $R^2=\!-CH_3$, m=1, n=1 (used in Example 7)

A: Ethylene glycol glycidyl allyl ether

B: Ethylene glycol monomethyl ether (Production Example of catalyst)

Tributyltin chloride (10 g) and tributyl phosphate (35 g) were charged in a three-necked flask equipped with a stirrer, a thermometer and a distillation device, and the mixture with stirring under nitrogen stream was heated at 250° C. for 20 minutes and the distillate was distilled off to obtain a solid condensate as a residue product. In the following polymerization, this organotin/phosphate ester condensate was used as a polymerization catalyst.

The composition analysis (in terms of monomer) of the polyether copolymer by element analysis and $^1$H NMR spectrum was conducted. In case of the measurement of the molecular weight of the polyether copolymer, the gel permeation chromatography measurement was conducted and the molecular weight was calculated in terms of standard polystyrene. The gel permeation chromatography measurement was conducted at 60° C. by a measuring device RID-6A manufactured by Shimadzu Corp., using a column manufactured by Showa Denko Co., Ltd. such as Showdex KD-807, KD-806, KD-806 and KD-803, and a solvent DMF. The glass transition temperature and fusion heat were measured in a nitrogen atmosphere within the temperature range from −100 to 80° C. at a heating rate of 10° C./min. by a differential scanning calorimeter DSC8230B manufactured by Rigaku Denki Co., Ltd. The measurement of the conductivity a was conducted as follows. That is, a film vacuum-dried at 20° C. under 1 mmHg for 72 hours (or gel-like film) was sandwiched between platinum electrodes and the conductivity was calculated according to the complex impedance method, using an AC. method (voltage: 0.5 V, frequency: 5 Hz to 1 MHz). The flexibility of the solid electrolyte film was evaluated by the presence or absence of breakage in case of folding the film at an angle of 180 degrees at 25° C.

EXAMPLE 1

After the atmosphere in a four-necked glass flask (internal volume: 3 L) was replaced by nitrogen, the condensate (1 g) obtained in the Preparation Example of the catalyst as the catalyst, 2-glycidoxy-1,3-bis(2-methoxyethoxy)propane (300 g) having a water content adjusted to not more than 10 ppm and n-hexane (1,000 g) as the solvent were charged in the flask, and ethylene oxide (75 g) was gradually added with monitoring the polymerization degree of 2-glycidoxy-1,3-bis(2-methoxyethoxy)propane by a gas chromatography. The polymerization reaction was terminated by using methanol. The polymer was isolated by decantation, dried at 40° C. under normal pressure for 24 hours, and then dried at 45° C. under reduced pressure for 10 hours to obtain 350 g of a polymer. The glass transition temperature of this copolymer was −73° C., the weight-average molecular weight was 250,000 and the fusion heat was 8 J/g. The results of the composition analysis (in terms of monomer) of this polymer by $^1$H NMR spectrum are shown in Table 1.

EXAMPLES 2 TO 7

Using the monomer shown in Table 1, the copolymerization was conducted by using the same catalyst and operation as in Example 1. The results are shown in Table 1.

EXAMPLES 8 TO 11 AND COMPARATIVE EXAMPLES 1 TO 4

The copolymer obtained in each of Examples 1 to 4 or a polyether copolymer (polyethylene oxide in Comparative Example 1) (1 g) in Table 3 was dissolved in tetrahydrofuran (20 ml), and the resulting solution was mixed with a tetrahydrofuran solution of lithium perchlorate so that a molar ratio of (the number of moles of the electrolyte salt compound to the total number of moles of ether oxygen atoms of polyether copolymer) was 0.05. This mixed solution was casted on a mold made of polytetrafluoroethylene, followed by sufficient drying to obtain a film. The electrical conductivity σ of the film was measured by an A.C. method described above. The results are shown in Tables 2 and 3. Comparative Example 4 is an example of copolymer of glycidyl ether having one oligooxy ethylene unit and ethylene oxide.

EXAMPLE 12

The copolymer (1 g) obtained in Example 5 was dissolved in acetonitrile (20 ml), and the resulting solution was mixed with an acetonitrile solution of lithium bistrifluoromethanesulfonylimide (hereinafter referred to as LiTFSI) so that a molar ratio of (the number of moles of the LiTFSI) to (the total number of moles of ether oxygen atoms of polyether copolymer) was 0.05. This mixed solution was casted on a mold made of polytetrafluoroethylene, followed by sufficient drying to obtain a film. The characteristics of the film were measured in the same manner as in Examples 8 to 11. The electrical conductivity of the solid electrolyte was $6.2 \times 10^{-4}$ S/cm at 25° C. The results are shown in Table 2.

EXAMPLE 13

The copolymer (1 g) obtained in Example 6 was dissolved in acetonitrile (20 ml), and the resulting solution was mixed with an acetonitrile solution of LiTFSI so that a molar ratio of (the number of moles of the LiTFSI) to (the total number of moles of ether oxygen atoms) was 0.03. This mixed solution was casted on a mold made of polytetrafluoroethylene, followed by sufficient drying to obtain a film. The characteristics of the resulting film were measured in the same manner as in Examples 8 to 11. The results are shown in Table 2.

EXAMPLE 14

A film was obtained in the same manner as in Example 13, except that a molar ratio of (the number of moles of the LiTFSI) to (the total number of moles of ether oxygen atoms) was 0.05. Properties of the film were measured in the same manner as in Examples 8 to 11. The results are shown in Table 2.

It is apparent from a comparison with Comparative Examples that the solid polymer electrolyte of the present invention has a particularly excellent ionic conductivity.

EXAMPLE 15

Using the solid polymer electrolyte obtained in Example 10 as the electrolyte, a lithium metal foil as a negative electrode and lithium cobaltate ($LiCoO_2$) as a positive electrode, a secondary battery was constructed. The size of the solid polymer electrolyte was 10 mm×10 mm×0.2 mm. The size of the lithium foil was 10 mm×10 mm×0.1 mm. Lithium cobaltate was prepared by mixing predetermined amount of lithium carbonate and cobalt carbonate powder and calcining the mixture at 900° C. for 5 hours. The calcined mixture was ground, and then 12 parts by weight of acetylene black and 3 parts by weight of the solid polymer electrolyte obtained in Example 10 were added to 85 parts by weight of the resulting lithium cobaltate, followed by mixing by a roll and further press-molding under the pressure of 300 KgW/cm² to form a positive electrode having the size of 10 mm×10 mm×2 mm.

The solid polymer electrolyte obtained in Example 10 was sandwiched between the lithium metal foil and the lithium cobaltate plate, and the charge/discharge characteristics of the resulting battery were examined at 25° C. with applying the pressure of 10 KgW/cm² so that the interfaces were brought into contact with each other. The discharge current at the initial terminal voltage of 3.8 V was 0.1 mA/cm² and charging could be conducted at 0.1 mA/cm². It is possible to easily reduce the thickness of the battery in this Example and, therefore, a light-weight and large-capacity battery can be obtained.

TABLE 1

Copolymer

| | Example No. | | | | | | |
|---|---|---|---|---|---|---|---|
| | 1 | 2 | 3 | 4 | 5 | 6 | 7 |
| Charged monomer (% by mol) | | | | | | | |
| Ethylene oxide | 60 | 90 | 83 | 78 | 88 | 71 | 95 |
| Monomer of formula (1) | 40 | 10 | 17 | 22 | 12 | 29 | 5 |
| Constituting unit in formula (1) | | | | | | | |
| Substituent: $R^1$ | —$CH_3$ | —$C_2H_5$ | —$CH_3$ | —$CH_3$ | —$CH_3$ | —$CH_3$ | —$CH_2$—$CH$=$CH_2$ |
| Substituent: $R^2$ | —$CH_3$ | —$CH_3$ | —$CH_3$ | —$CH_3$ | —$CH_3$ | —$CH_3$ | —$CH_3$ |
| Polymerization degree: m | 1 | 1 | 2 | 3 | 1 | 1 | 1 |
| Polymerization degree: n | 1 | 2 | 2 | 1 | 1 | 2 | 1 |
| Composition of copolymer (% by mol) | | | | | | | |
| Ethylene oxide | 63 | 90 | 85 | 80 | 88 | 72 | 95 |
| Monomer of formula (1) | 37 | 10 | 15 | 20 | 12 | 28 | 5 |
| Weight-average molecular weight of copolymer | 250,000 | 900,000 | 1,520,000 | 650,000 | 4,100,000 | 800,000 | 1,900,000 |
| Glass transition temperature of copolymer (° C.) | −73 | −70 | −72 | −73 | −70 | −72 | −69 |
| Fusion heat of copolymer (J/g) | 8 | 62 | 41 | 27 | 51 | 18 | 82 |

TABLE 2

Solid polymer electrolyte

| | Example No. | | | | | | |
|---|---|---|---|---|---|---|---|
| | 8 | 9 | 10 | 11 | 12 | 13 | 14 |
| Used copolymer | Example No. 1 | Example No. 2 | Example No. 3 | Example No. 4 | Example No. 5 | Example No. 6 | Example No. 7 |
| Conductivity of solid electrolyte film (S/cm) 25° C. | $8.7 \times 10^{-4}$ | $2.1 \times 10^{-4}$ | $7.9 \times 10^{-4}$ | $5.7 \times 10^{-4}$ | $6.2 \times 10^{-4}$ | $7.1 \times 10^{-4}$ | $1.8 \times 10^{-4}$ |

TABLE 3

| | Comparative example | | | |
|---|---|---|---|---|
| | 1 | 2 | 3 | 4 |
| Composition of copolymer (% by mol) | | | | |
| Ethylene oxide | 100 | 98 | 10 | 20 |
| Epichlorohydrin | | | | |
| Propylene oxide | | | | |
| Ethylene glycol glycidyl methyl ether | | | | 80 |
| Monomer of the formula (1) | | 2 | 90 | |
| Constituting unit in formula (1) | | | | |
| Substituent: $R^1$ | | —$C_2H_5$ | —$C_2H_5$ | |
| Substituent: $R^2$ | | —$CH_3$ | —$CH_3$ | |
| Polymerization degree: m | | 1 | 1 | |
| Polymerization degree: n | | 1 | 1 | |
| Weight-average molecular weight of copolymer | 250,000 | 3,900,000 | 200,000 | 1,200,000 |
| Glass transition temperature of copolymer (° C.) | −59 | −62 | −68 | −63 |
| Fusion heat of copolymer (J/g) | 170 | 98 | 40 | 35 |
| Conductivity of solid electrolyte film (S/cm) 25° C. | $1.6 \times 10^{-6}$ | $1.7 \times 10^{-5}$ | impossible to measure because of plastic deformation | $1.2 \times 10^{-4}$ |

Note) Monomer of the formula (1):

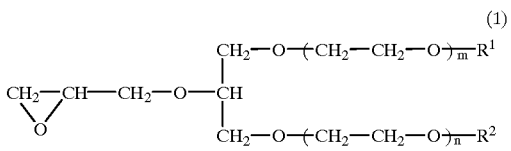

SYNTHESIS EXAMPLE 3 OF MONOMER

Using the following ethers in place of A: ethylene glycol glycidyl methyl ether and B: ethylene glycol monomethyl ether of step 1 in Synthesis Example 1 of monomer, a monomer (1) was synthesized by conducting the same operation as that of step 1 in Synthesis Example 1 of monomer and reacting epichlorohydrin in the same manner as that of step 2 in Synthesis Example 1 of monomer.

Monomer (1):

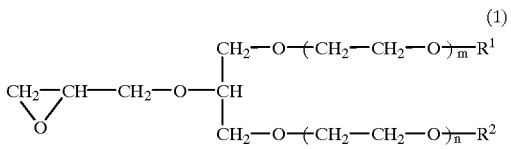

Formula (1): $R^1$=—$C_2H_5$, $R^2$=—$CH_3$, m=1, n=2 (used in Examples 17 and 24)
A: Ethylene glycol glycidyl ethyl ether
B: Diethylene glycol monomethyl ether
Formula (1): $R^1$=—$CH_3$, $R^2$=—$CH_3$, m=2, n=2 (used in Examples 18 and 25)
A: Diethylene glycol glycidyl methyl ether
B: Diethylene glycol monomethyl ether
Formula (1): $R^1$=—$CH_3$, $R^2$=—$CH_3$, m=3, n=1 (used in Examples 19 and 26)
A: Triethylene glycol glycidyl methyl ether
B: Ethylene glycol monomethyl ether
Formula (1): $R^1$=—$CH_3$, $R^2$=—$CH_3$, m=1, n=2 (used in Examples 21 and 28)
A: Ethylene glycol glycidyl methyl ether
B: Diethylene glycol monomethyl ether
Formula (1): $R^1$=—$CH_2$—CH=$CH_2$, $R^2$=—$CH_3$, m=1, n=1 (used in Example 22)
A: Ethylene glycol glycidyl allyl ether
B: Ethylene glycol monomethyl ether
Formula (1): $R^1$=—$C_2H_5$, $R^2$=—$CH_3$, m=1, n=2 (used in Example 24)
A: Ethylene glycol glycidyl ethyl ether
B: Ethylene glycol monomethyl ether

EXAMPLE 16

After the atmosphere in a four-necked glass flask (internal volume: 3 L) was replaced by nitrogen, the condensate (1 g) shown in Preparation Example of catalyst as the catalyst, allyl glycidyl ether (17 g) having a water content adjusted to not more than 10 ppm, 2-glycidoxy-1,3-bis(2-methoxyethoxy)propane (160 g) and n-hexane (1,000 g) as the solvent were charged in the flask, and ethylene oxide (190 g) was gradually added with monitoring the polymerization degree of 2-glycidoxy-1,3-bis(2-methoxyethoxy) propane by gas chromatography. The polymerization reaction was terminated by using methanol. The polymer was isolated by decantation, dried at 40° C. under normal pressure for 24 hours, and then dried at 45° C. under reduced pressure for 10 hours to obtain 321 g of a polymer. The glass transition temperature of this copolymer was −71° C., the weight-average molecular weight was 3,700,000 and the fusion heat was 60 J/g. The results of the composition analysis (in terms of monomer) of this polymer by 1H NMR spectrum are as shown in Table 4.

EXAMPLES 17 TO 28

Using the monomer shown in Table 4, the copolymerization was conducted by using the same catalyst and operation as in Example 16. The results are shown in Table 4.

EXAMPLE 29

The polyether copolymer (1 g) obtained in Example 16 and a crosslinking agent dicumyl peroxide (0.015 g) were dissolved in tetrahydrofuran (20 ml), and the resulting solution was mixed with a tetrahydrofuran solution of lithium perchlorate so that a molar ratio of (the number of moles of the electrolyte salt compound) to (the total number of moles of ether oxygen atoms of the copolymer) was 0.05. This mixed solution was casted on a mold made of polytetrafluoroethylene, dried and then heated and pressured at 170° C. and 60 KgW/cm$^2$ for 10 minutes to obtain a film. The measurement results for the conductivity and flexibility of the film are shown in Table 5.

EXAMPLE 30

The polyether copolymer (1 g) obtained in Example 17 and a crosslinking agent 1,1-bis(t-butylperoxy)-3,3,5-trimethylcyclohexane (0.02 g) were dissolved in tetrahydrofuran (20 ml), and the resulting solution was mixed with a tetrahydrofuran solution of lithium perchilorate so that a molar ratio of (the number of moles of the electrolyte salt compound) to (the total number of moles of ether oxygen atoms of the copolymer) was 0.05. This mixed solution was casted on a mold made of polytetrafluoroethylene, dried and then heated and pressured at 145° C. and 100 KgW/cm$^2$ for 10 minutes to obtain a film. The measurement results for the conductivity and flexibility of the film are shown in Table 5.

EXAMPLE 31

The polyether copolymer (1 g) obtained in Example 18 and a crosslinking agent benzoyl peroxide (0.015 g) were dissolved in acetonitrile (20 ml), and the resulting solution was mixed with an acetonitrile solution of lithium bistrifluoromethanesulfonylimide so that a molar ratio of (the number of moles of the electrolyte salt compound) to (the total number of moles of ether oxygen atoms of the copolymer) was 0.05, and then a film was obtained in the same manner as in Example 29. The measurement results for the electrical conductivity and flexibility of the film are shown in Table 5.

EXAMPLE 32

The polyether copolymer (1 g) obtained in Example 19 and a crosslinking agent azobisisobutyronitrile (0.02 g) were dissolved in tetrahydrofuran (20 ml), and the resulting solution was mixed with a tetrahydrofuran solution of lithium perchlorate so that a molar ratio of (the number of moles of the electrolyte salt compound) to (the total number of moles of ether oxygen atoms of the copolymer) was 0.05. This mixed solution was casted on a mold made of polytetrafluoroethylene, dried and then allowed to stand at 100° C. under an argon atmosphere for 2 hours to obtain a film. The measurement results for the electrical conductivity and flexibility of the film are shown in Table 5.

EXAMPLE 33

The polyether copolymer (1 g) obtained in Example 20 and a sensitizer 2,2-dimethoxy-1,2-diphenylethan-1-one (0.02 g) were dissolved in tetrahydrofuran (20 ml), and the resulting solution was mixed with a tetrahydrofuran solution of lithium perchlorate so that a molar ratio of (the number of moles of the electrolyte salt compound) to (the total number of moles of ether oxygen atoms of the copolymer) was 0.05. This mixed solution was casted on a mold made of polytetrafluoroethylene and dried, followed by ultraviolet ray irradiation (30 mW/cm$^2$, 360 nm) at 50° C. under an argon atmosphere for 10 minutes to obtain a film. The measurement results for the electrical conductivity and flexibility of the film are shown in Table 5.

EXAMPLE 34

The polyether copolymer (1 g) obtained in Example 21 and polysiloxane (0.2 g) represented by the formula (11) were dissolved in toluene (10 ml) and an isopropyl alcohol solution containing 1% by weight of chloroplatinic acid was added, and the resulting solution was mixed with a toluene solution of lithium bistrifluoromethanesulfonylimide so that a molar ratio of (the number of moles of the electrolyte salt compound) to (the total number of moles of ether oxygen atoms of the copolymer) was 0.05, and then a film was obtained in the same manner as in Example 29. The measurement results for the electrical conductivity and flexibility of the film are shown in Table 5. In the formula (11), Mn represents a number-average molecular weight.

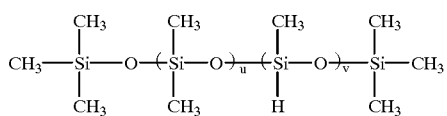

(Mn 2180, v/(u+v) = 0.33)

EXAMPLE 35

The polyether copolymer (1 g) obtained in Example 22 and polysiloxane (0.2 g) represented by the formula (12) were dissolved in toluene (10 ml) and an isopropyl alcohol solution containing 1% by weight of chloroplatinic acid was added, and the resulting solution was mixed with a toluene solution of lithium bistrifluoromethanesulfonylimide so that a molar ratio of (the number of moles of the soluble electrolyte salt compound) to (the total number of moles of ether oxygen atoms of the copolymer) was 0.05, and then a film was obtained in the same manner as in Example 29. The measurement results for the electrical conductivity and flexibility of the film are shown in Table 5. In the formula (12), Mn represents a number-average molecular weight.

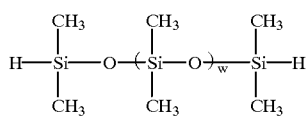

(Mn 1000)

EXAMPLE 36

The polyether copolymer (1 g) obtained in Example 23 and a catalyst dibutyltin dilaurate (5 mg) were dissolved in tetrahydrofuran (20 ml), and the resulting solution was mixed with a tetrahydrofuran solution of lithium perchlorate so that a molar ratio of (the number of moles of the electrolyte salt compound) to (the total number of moles of ether oxygen atoms of the copolymer) was 0.05 and water was added to this mixed solution in the same amount as that of the reactive silicon group-containing component. This mixed solution was casted on a mold made of polytetrafluoroethylene, dried and then allowed to stand at 100° C. under an argon atmosphere for 3 hours to obtain a film. The measurement results for the electrical conductivity and flexibility of the film are shown in Table 5.

EXAMPLE 37

The polyether copolymer (1 g) obtained in Example 24 was dissolved in tetrahydrofuran (20 ml), and the resulting solution was mixed with a tetrahydrofuran solution of lithium perchlorate so that a molar ratio of (the number of moles of the electrolyte salt compound) to (the total number of moles of ether oxygen atoms of the copolymer) was 0.05. To this mixed solution, water was added in the three times molar amount the reactive silicon group-containing component. This mixed solution was casted on a mold made of polytetrafluoroethylene, dried, heated and pressured at 160° C. and 20 KgW/cm$^2$ for 10 minutes to obtain a film. The measurement results for the electrical conductivity and flexibility of the film are shown in Table 5.

EXAMPLE 38

The polyether copolymer (1 g) obtained in Example 25 and a catalyst dibutyltin dilaurate (5 mg) were dissolved in tetrahydrofuran (20 ml) and water (10 µl) was added, followed by stirring for 15 minutes. After the solvent was removed under a normal pressure, the mixed solution was dried at 60° C. for 10 hours to obtain a crosslinked material. The resulting crosslinked material was impregnated with a tetrahydrofuran solution (5 ml) containing lithium perchlorate (100 mg) for 20 hours, heated and pressured at 170° C. and 80 KgW/cm$^2$ for 10 minutes to obtain a film. The measurement results for the electrical conductivity and flexibility of the film are shown in Table 5.

EXAMPLE 39

The polyether copolymer (1 g) obtained in Example 26 and maleic anhydride (150 mg) were dissolved in tetrahydrofuran (20 ml), and the resulting solution was mixed with a tetrahydrofuran solution of lithium perchlorate so that a molar ratio of (the number of moles of the soluble electrolyte salt compound) to (the total number of moles of ether oxygen atoms of the copolymer) was 0.05. This mixed solution was casted on a mold made of polytetrafluoroethylene, dried and then heated and pressured at 160° C. and 20 KgW/cm² for one hour to obtain a film. The measurement results for the electrical conductivity and flexibility of the film are shown in Table 5.

EXAMPLE 40

The polyether copolymer (1 g) obtained in Example 27 and diethylenetriamine (50 mg) were dissolved in tetrahydrofuran (20 ml), and the resulting solution was mixed with a tetrahydrofuran solution of lithium perchlorate so that a molar ratio of (the number of moles of the soluble electrolyte salt compound) to (the total number of moles of ether oxygen atoms of the copolymer) was 0.05. This mixed solution was casted on a mold made of polytetrafluoroethylene, dried and then allowed to stand at 100° C. under an argon atmosphere for 10 hours to obtain a film. The measurement results for the conductivity and flexibility of the film are shown in Table 5.

EXAMPLE 41

The polyether copolymer (1 g) obtained in Example 28 and diethylene triamine (50 mg) were dissolved in tetrahydrofuran (20 ml) and the reaction was conducted at 40° C. for 2 hours. After the solvent was removed under a normal pressure, the mixed solution was dried at 60° C. for 6 hours to obtain a crosslinked material. The resulting crosslinked material was impregnated with a tetrahydrofuran solution (5 ml) containing lithium perchlorate (100 mg) for 20 hours, heated and pressured at 160° C. and 100 KgW/cm² for 10 minutes to obtain a film. The measurement results for the conductivity and flexibility of the film are shown in Table 5.

TABLE 4

| | Copolymer | | | | | | |
|---|---|---|---|---|---|---|---|
| | Example No. | | | | | | |
| | 16 | 17 | 18 | 19 | 20 | 21 | 22 |
| Charged monomer(% by mol) | | | | | | | |
| Ethylene oxide | 85 | 90 | 80 | 58 | 70 | 55 | 91 |
| Allyl glycidyl ether | 3 | 4 | | | 4 | 3 | 2 |
| Glycidyl methacrylate | | | | | | | |
| Monomer of the formula (1) | 12 | 6 | 17 | 39 | 26 | 42 | 7 |
| Constituting unit of formula (1) | | | | | | | |
| Substituent: R¹ | —CH₃ | —C₂H₅ | —CH₃ | —CH₃ | —CH₃ | —CH₃ | —CH₂—CH═CH₂ |
| Substituent: R² | —CH₃ | —CH₃ | —CH₃ | —CH₃ | —CH₃ | —CH₃ | —CH₃ |
| Polymerization degree: m | 1 | 1 | 2 | 3 | 1 | 1 | 1 |
| Polymerization degree: n | 1 | 2 | 2 | 1 | 1 | 2 | 1 |
| Composition of formed copolymer (% by mol) | | | | | | | |
| Ethylene oxide | 85 | 91 | 81 | 60 | 72 | 57 | 91 |
| Allyl glycidyl ether | 3 | 3 | | | 4 | 3 | 2 |
| Glycidyl methacrylate | | | 3 | 3 | | | |
| Monomer of the formula (1) | 12 | 6 | 16 | 37 | 24 | 40 | 7 |
| Weight-average molecular weight of copolymer | 3,700,000 | 2,600,000 | 980,000 | 580,000 | 1,710,000 | 260,000 | 1,250,000 |
| Glass transition temperature of copolymer (° C.) | −71 | −69 | −71 | −74 | −72 | −74 | −70 |
| Fusion heat of copolymer (J/g) | 60 | 71 | 45 | 10 | 29 | 3 | 58 |

| | Example No. | | | | | |
|---|---|---|---|---|---|---|
| | 23 | 24 | 25 | 26 | 27 | 28 |
| Charged monomer(% by mol) | | | | | | |
| Ethylene oxide | 90 | 80 | 70 | 80 | 75 | 65 |
| 3-Glycidoxypropylmethyldimethoxysilane | 0.1 | 0.05 | | | | |
| 3-Glycidoxypropyltrimethoxysilane | | | 0.03 | | | |
| 2,3-Epoxypropyl-2',3'-epoxy-2'-methyl propyl ether | | | | 8 | 8 | |
| Diethylene glycol 2,3-epoxypropyl-2',3'-epoxy-2'-methyl propyl ether | | | | | | 10 |
| Monomer of the formula (1) | 9.9 | 19.95 | 29.97 | 12 | 17 | 25 |
| Constituting unit of formula (1) | | | | | | |
| Substituent: R¹ | —CH₃ | —C₂H₅ | —CH₃ | —CH₃ | —CH₃ | —CH₃ |
| Substituent: R² | —CH₃ | —CH₃ | —CH₃ | —CH₃ | —CH₃ | —CH₃ |
| Polymerization degree: m | 1 | 1 | 2 | 3 | 1 | 1 |
| Polymerization degree: n | 1 | 1 | 2 | 1 | 1 | 2 |
| Composition of formed copolymer (% by mol) | | | | | | |
| Ethylene oxide | 90.5 | 81 | 72 | 82 | 76 | 67 |
| 3-Glycidoxypropylmethyldimethoxysilane | 0.1 | 0.05 | | | | |
| 3-Glycidoxypropyltrimethoxysilane | | | 0.03 | | | |
| 2,3-Epoxypropyl-2',3'-epoxy-2'-methyl propyl ether | | | | | 7 | 7 |

TABLE 4-continued

| | Copolymer | | | | | |
|---|---|---|---|---|---|---|
| Diethylene glycol 2,3-epoxypropyl-2',3'-epoxy-2'-methyl propyl ether | | | | | | 8 |
| Monomer of the formula (1) | 9.4 | 18.95 | 27.97 | 11 | 17 | 25 |
| Weight-average molecular weight of copolymer | 4,100,000 | 2,600,000 | 1,100,000 | 650,000 | 420,000 | 280,000 |
| Glass transition temperature of copolymer (° C.) | −71 | −71 | −72 | −71 | −71 | −74 |
| Fusion heat of copolymer (J/g) | 75 | 47 | 33 | 41 | 32 | 18 |

TABLE 5

| | Solid polymer electrolyte | | | | | | |
|---|---|---|---|---|---|---|---|
| | Example No. | | | | | | |
| | 29 | 30 | 31 | 32 | 33 | 34 | 35 |
| Used copolymer | Example No. 16 | Example No. 17 | Example No. 18 | Example No. 19 | Example No. 20 | Example No. 21 | Example No. 22 |
| Flexibility of solid electrolyte film | Not broken | Not broken | Not broken | Not broken | Not broken | Not broken | Not broken |
| Conductivity of solid electrolyte film (S/cm) | | | | | | | |
| 25° C. | $3.4 \times 10^{-4}$ | $1.5 \times 10^{-4}$ | $5.2 \times 10^{-4}$ | $6.2 \times 10^{-4}$ | $5.1 \times 10^{-4}$ | $7.5 \times 10^{-4}$ | $9.8 \times 10^{-5}$ |
| 65° C. | $1.7 \times 10^{-3}$ | $9.3 \times 10^{-4}$ | $2.7 \times 10^{-3}$ | $3.3 \times 10^{-3}$ | $2.6 \times 10^{-3}$ | $4.8 \times 10^{-3}$ | $7.2 \times 10^{-4}$ |

| | Example No. | | | | | |
|---|---|---|---|---|---|---|
| | 36 | 37 | 38 | 39 | 40 | 41 |
| Used copolymer | Example No. 23 | Example No. 24 | Example No. 25 | Example No. 26 | Example No. 27 | Example No. 28 |
| Flexibility of solid electrolyte film | Not broken | Not broken | Not broken | Not broken | Not broken | Not broken |
| Conductivity of solid electrolyte film (S/cm) | | | | | | |
| 25° C. | $2.1 \times 10^{-4}$ | $2.2 \times 10^{-4}$ | $4.1 \times 10^{-4}$ | $3.1 \times 10^{-4}$ | $4.6 \times 10^{-4}$ | $5.7 \times 10^{-4}$ |
| 65° C. | $1.0 \times 10^{-3}$ | $1.1 \times 10^{-3}$ | $2.3 \times 10^{-3}$ | $1.5 \times 10^{-3}$ | $2.5 \times 10^{-3}$ | $3.1 \times 10^{-3}$ |

Note) Monomer of the formula (1):

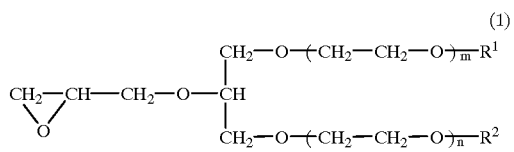

COMPARATIVE EXAMPLES 5 to 8

The polyether copolymer shown in Table 6 obtained in the same manner as in Example 16 was used.

In Comparative 5, a film molding was conducted in the same manner as in Example 29, except for adding no crosslinking agent. In Comparative Example 6, a film molding was conducted in the same manner as in Example 30. In Comparative Example 7, a film molding was conducted in the same manner as in Example 36. In Comparative Example 8, a film molding was conducted in the same manner as in Example 39. The results are shown in Table 6.

It is apparent from a comparison with Comparative Examples that the ionic conductivity and mechanical characteristics of the crosslinked solid polymer electrolyte obtained from the polyether copolymer of the present invention are excellent.

TABLE 6

| | Copolymer and Solid polymer electrolyte | | | |
|---|---|---|---|---|
| | Comparative example | | | |
| | 5 | 6 | 7 | 8 |
| Composition of formed copolymer (% by mol) | | | | |
| Ethylene oxide | 80 | 98 | 63 | 60 |
| Allyl glycidyl ether | | 2 | | |

TABLE 6-continued

Copolymer and Solid polymer electrolyte

| | Comparative example | | | |
|---|---|---|---|---|
| | 5 | 6 | 7 | 8 |
| 3-Glycidoxypropyltrimethoxysilane | | | 27 | |
| 2,3-Epoxypropyl-2',3'-epoxy-2'-methyl propyl ether | | | | 30 |
| Monomer of the formula (1) | 20 | | 10 | 10 |
| Constituting unit of formula (1) | | | | |
| Substituent: $R^1$ | —$C_2H_5$ | | | |
| Substituent: $R^2$ | —$CH_3$ | | | |
| Polymerization degree: m | 1 | | | |
| Polymerization degree: n | 1 | | | |
| Number-average molecular weight of copolymer | 780,000 | 3,600,000 | insoluble in solvent | insoluble in solvent |
| Glass transition temperature of copolymer (° C.) | −70 | −62 | impossible to measure | impossible to measure |
| Fusion heat of copolymer (J/g) | 45 | 145 | impossible to measure | impossible to measure |
| Flexibility of solid electrolyte film | Not broken | Not broken | impossible to form film | impossible to form film |
| Conductivity of solid electrolyte film (S/cm) | | | | |
| 25° C. | $7.5 \times 10^{-4}$ | $1.2 \times 10^{-6}$ | impossible to measure | impossible to measure |
| 65° C. | difficult to measure because of plastic deformation | $9.5 \times 10^{-6}$ | impossible to measure | impossible to measure |

Note) Monomer of the formula (1):

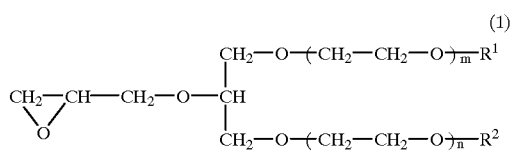

(1)

EXAMPLE 42

Using the crosslinked solid polymer electrolyte obtained in Example 29 as the electrolyte, a lithium metal foil as a negative electrode and lithium cobaltate ($LiCoO_2$) as a positive electrode, a secondary battery was constructed. The size of the crosslinked solid polymer electrolyte was 10 mm×10 mm×0.2 mm. The size of the lithium foil was 10 mm×10 mm×0.1 mm. Lithium cobaltate was prepared by mixing predetermined amount of lithium carbonate and cobalt carbonate powder and calcining the mixture at 900° C. for 5 hours. The calcined mixture was ground, and then 12 parts by weight of acetylene black and 3 parts by weight of the crosslinked solid polymer electrolyte obtained in Example 29 were added to 85 parts by weight of the resulting lithium cobaltate, followed by mixing by a mortar and press-molding under the pressure of 300 $KgW/cm^2$ to form a positive electrode having the size of 10 mm×10 mm×2 mm.

The crosslinked solid polymer electrolyte obtained in Example 29 was sandwiched between the lithium metal foil and the lithium cobaltate plate, and the charge/discharge characteristics of the resulting battery were examined with applying the pressure of 10 $KgW/cm^2$ so that the interfaces were brought into contact with each other. The discharge current at the initial terminal voltage of 3.8 V was 0.1 $mA/cm^2$ and the charging could be conducted at 0.1 $mA/cm^2$. It is possible to easily reduce the thickness of the battery in this Example and, therefore, a light-weight and large-capacity battery can be obtained.

EXAMPLE 43

After the atmosphere in a four-necked glass flask (internal volume: 3 L) was replaced by nitrogen, an organotin-phosphate ester condensate (1 g) as the catalyst, a glycidyl ether compound (222 g) represented by the formula (1) ($R^1$, $R^2$=$CH_3$; m, n=2) having a water content adjusted to not more than 10 ppm and n-hexane (1,000 g) as the solvent were charged in the flask, and ethylene oxide (28 g) was gradually added with monitoring the polymerization degree of the glycidyl ether compound by gas chromatography. The polymerization reaction was terminated by using methanol. The polymer was isolated by decantation, dried at 40° C. under normal pressure for 24 hours, and then dried at 45° C. under reduced pressure for 10 hours to obtain 195 g of a polymer. The glass transition temperature of this polymer was −75° C., the weight-average molecular weight by gel permeation chromatography was 150,000 and the fusion heat was 0 J/g. The results of the composition analysis (in terms of monomer) of this polymer by $^1H$ NMR spectrum are as shown in Table 7. The resulting polyether copolymer (1 g) was mixed with a propylene carbonate solution (1 g) of lithium perchlorate so that a molar ratio of (the number of moles of the soluble electrolyte salt compound) to (the total number of moles of ether oxygen atoms of the copolymer) was 0.05. This mixed solution was casted on a mold made of polytetrafluoroethylene, heated and pressured at 100° C. and 2 $KgW/cm^2$ for 10 minutes to obtain a film.

EXAMPLE 44

The polyether copolymer (1 g) shown in Table 7 polymerized in the same manner as in Example 43 using the organotin-phosphate ester condensate catalyst, ethylene thiourea (a crosslinking agent) (0.015 g) and dibasic lead phthalate (0.05 g) were mixed with a propylene carbonate solution (0.8 g) of lithium perchlorate so that a molar ratio of (the number of moles of the electrolyte salt compound) to (the total number of moles of ether oxygen atoms of the copolymer) was 0.07. This mixed solution was casted on a mold made of polytetrafluoroethylene, dried, heated and pressured at 170° C. and 60 KgW/cm² for 15 minutes to obtain a film.

EXAMPLE 45

The polyether copolymer (1 g) shown in Table 7 polymerized in the same manner as in Example 43 using the organotin-phosphate ester condensate catalyst, and dicumyl peroxide (a crosslinking agent) (0.015 g) were mixed with a propylene carbonate solution (0.7 g) of lithium perchlorate so that a molar ratio of (the number of moles of the electrolyte salt compound) to (the total number of moles of ether oxygen atoms of the copolymer) was 0.05. This mixed solution was casted on a mold made of polytetrafluoroethylene, dried, heated and pressured at 160° C. and 20 KgW/cm² for 10 minutes to obtain a gel-like film.

EXAMPLE 46

The polyether copolymer (1 g) shown in Table 7 polymerized in the same manner as in Example 43 using the organotin-phosphate ester condensate catalyst, polyethylene glycol dimethyl ether (number-average molecular weight Mn: 1000) (0.3 g) and a crosslinking agent dicumyl peroxide (0.015 g) were dissolved in tetrahydrofuran (20 ml), and the resulting solution was mixed with a tetrahydrofuran solution (5 ml) of lithium perchlorate so that a molar ratio of (the number of moles of the electrolyte salt compound) to (the total number of ether oxygen atoms of the copolymer) was 0.05. This mixed solution was casted on a mold made of polytetrafluoroethylene, dried, heated and pressured at 160° C. and 20 KgW/cm² for 10 minutes to obtain a film.

EXAMPLE 47

The polyether copolymer (1 g) shown in Table 7 polymerized in the same manner as in Example 43 using the organotin-phosphate ester condensate catalyst, polyethylene glycol diethyl ether (Mn: 1000) (0.2 g) and dicumyl peroxide (a crosslinking agent) (0.015 g) were dissolved in tetrahydrofuran (20 ml), and the resulting solution was mixed with a tetrahydrofuran solution (5 ml) of lithium perchlorate so that a molar ratio of (the number of moles of the electrolyte salt compound) to (the total number of moles of ether oxygen atoms of the copolymer) was 0.05. This mixed solution was casted on a mold made of polytetrafluoroethylene, dried, heated and pressured at 160° C. and 20 KgW/cm² for 10 minutes to obtain a film.

EXAMPLE 48

The polyether copolymer (1 g) shown in Table 7 polymerized in the same manner as in Example 43 using the organotin-phosphate ester condensate catalyst, a lithium salt of polyethylene glycol (prepared by adding a 2-fold molar amount of metal lithium to polyethylene glycol having a number-average molecular weight of 400, followed by standing at room temperature for 3 days) (0.3 g) and dicumyl peroxide (a crosslinking agent) (0.015 g) were dissolved in tetrahydrofuran (20 ml), and the resulting solution was mixed with a tetrahydrofuran solution (5 ml) of lithium perchlorate so that a molar ratio of (the number of moles of the electrolyte salt compound) to (the total number of moles of ether oxygen atoms of the copolymer) was 0.05. This mixed solution was casted on a mold made of polytetrafluoroethylene, dried, heated and pressured at 160° C. and 20 KgW/cm² for 10 minutes to obtain a film.

EXAMPLE 49

The polyether copolymer (1 g) shown in Table 7 polymerized in the same manner as in Example 43 using the organotin-phosphate ester condensate catalyst, and a sodium salt of polyethylene glycol monomethyl ether (prepared by adding an equimolar amount of metal sodium to polyethylene glycol monoethyl ether having a number-average molecular weight of 500, followed by standing at room temperature for 3 days) (0.4 g) were added to a tetrahydrofuran solution (20 ml) of lithium bistrifluoromethanesulfonylimide so that a molar ratio of (the number of moles of the electrolyte salt compound) to (the total number of moles of ether oxygen atoms of the copolymer) was 0.05. To the resulting solution, water was added in an equimolar amount based on the reactive silicon group-containing component, followed by mixing. This mixed solution was casted on a mold made of polytetrafluoroethylene, dried, heated and pressured at 160° C. and 20 KgW/cm² for 10 minutes to obtain a film.

EXAMPLES 50 TO 52

The polyether copolymer (1 g) shown in Table 7 polymerized in the same manner as in Example 43 using the organotin-phosphate ester condensate catalyst, and dicumyl peroxide (a crosslinking agent) (0.01 g) and N,N'-m-phenylene bismaleimide (0.005 g) were added to an acetonitrile solution (10 ml) of lithium perchlorate so that a molar ratio of (the number of moles of the soluble electrolyte salt compound) to (the total number of moles of ether oxygen atoms of the copolymer) was 0.06. To the resulting solution, a branched ethylene glycol derivative represented by the formula (16) in Example 50, by the formula (17) in Example 51, or by the formula (18) in Example 52 was mixed. This mixed solution was casted on a mold made of polytetrafluoroethylene, dried, heated and pressured at 160° C. and 20 KgW/cm² for 10 minutes to obtain a film.

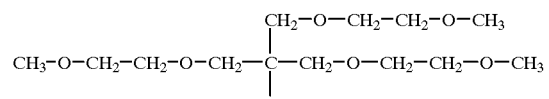

(16)

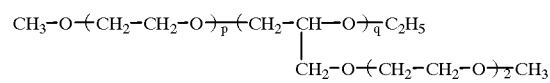

(17)

Mn 560, q/(p+q) = 0.1

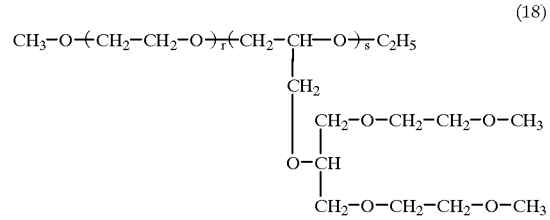

(18)

Mn 880, s/(r+s) = 0.1

(Mn represents average molecular weight.)

COMPARATIVE EXAMPLE 9

The polyethylene oxide (1 g) shown in Table 8 polymerized in the same manner as in Example 43 using the organotin-phosphate ester condensate catalyst was mixed with a tetrahydrofuran solution of lithium perchlorate so that a molar ratio of (the number of moles of the electrolyte salt compound) to (the total number of moles of ether oxygen atoms of the copolymer) was 0.05. Then polyethylene glycol dimethyl ether (Mn: 1,000) (0.2 g) was dissolved in tetrahydrofuran (20 ml) and this solution was added. This mixed solution was casted on a mold made of polytetrafluoroethylene and a film was obtained by pressure molding.

COMPARATIVE EXAMPLE 10

The same operation as in Comparative Example 9, except for using the polyether copolymer shown in Table 8 polymerized in the same manner as in Example 43 using the organotin-phosphate ester condensate catalyst, was conducted, but a film could not be formed.

COMPARATIVE EXAMPLE 11

The polyether copolymer (1 g) shown in Table 8 polymerized in the same manner as in Example 43 using the organotin-phosphate ester condensate catalyst and dicumyl peroxide (a crosslinking agent) (0.015 g) were dissolved in tetrahydrofuran (20 ml), and the resulting solution was mixed with a tetrahydrofuran solution of lithium perchlorate so that a molar ratio of (the number of moles of the electrolyte salt compound) to (the total number of moles of ether oxygen atoms of the copolymer) was 0.05. Then polyethylene glycol dimethyl ether (Mn: 1,000) (0.2 g) was dissolved in tetrahydrofuran (20 ml) and this solution was added. This mixed solution was casted on a mold made of polytetrafluoroethylene, dried so that tetrahydrofuran was thoroughly removed, heated and pressured at 160° C. and 20 KgW/cm$^2$ for 10 minutes to obtain a film.

COMPARATIVE EXAMPLE 12

A film was obtained in the same manner as in Example 45, except for using the polyether copolymer shown in Table 8 polymerized in the same manner as in Example 43 using the organotin-phosphate ester condensate catalyst.

EXAMPLE 53

Using the solid polymer electrolyte obtained in Example 45 as the electrolyte, a lithium metal foil as a negative electrode and lithium cobaltate (LiCoO$_2$) as a positive electrode, a secondary battery was constructed. The size of the solid polymer electrolyte was 10 mm×10 mm×0.2 mm. The size of the lithium foil was 10 mm×10 mm×0.1 mm. Lithium cobaltate was prepared by mixing predetermined amount of lithium carbonate and cobalt carbonate powder and calcining the mixture at 900° C. for 5 hours. The calcined mixture was ground, and then 12 parts by weight of acetylene black and 3 parts by weight of the crosslinked solid polymer electrolyte obtained in Example 45 were added to 85 parts by weight of the resulting lithium cobaltate, followed by mixing by a roll and press-molding under the pressure of 300 KgW/cm$^2$ to form a positive electrode having the size of 10 mm×10 mm×2 mm.

The crosslinked solid polymer electrolyte obtained in Example 45 was sandwiched between the lithium metal foil and the lithium cobaltate plate, and the charge/discharge characteristics of the resulting battery were examined with applying the pressure of 10 KgW/cm$^2$ so that the interfaces were brought into contact with each other. The discharge current at the initial terminal voltage of 3.8 V was 0.1 mA/cm$^2$ and the charging could be conducted at 0.1 mA/cm$^2$. It is possible to easily reduce the thickness of the battery in this Example and, therefore, a light-weight and large-capacity battery can be obtained.

TABLE 7

| | Example No. | | | | | | |
|---|---|---|---|---|---|---|---|
| | 43 | 44 | 45 | 46 | 47 | 48 | 49 |
| Composition of formed copolymer (% by mol) | | | | | | | |
| Ethylene oxide | 50 | 90 | 52 | 59 | 89.97 | 54 | 68 |
| Allyl glycidyl ether | | | 3 | | | | |
| Glycidyl methacrylate | | | | 4 | | | |
| 3-Glycidoxypropyltrimethoxy silane | | | | | 0.03 | | |
| 2,3-Epoxypropyl-2',3'-epoxy-2'-methyl propyl ether | | | | | | 14 | 12 |
| Monomer of formula (1) | 50 | 10 | 45 | 37 | 10 | 32 | 20 |
| Constituting unit of formula (1) | | | | | | | |
| Substituent: R$^1$ | —CH$_3$ | —C$_2$H$_5$ | —CH$_3$ | —CH$_3$ | —CH$_3$ | —CH$_3$ | —CH$_2$—CH=CH$_2$ |
| Substituent: R$^2$ | —CH$_3$ | —CH$_3$ | —CH$_3$ | —CH$_3$ | —CH$_3$ | —CH$_3$ | —CH$_3$ |
| Polymerization degree: m | 2 | 1 | 2 | 3 | 1 | 1 | 1 |
| Polymerization degree: n | 2 | 2 | 2 | 1 | 1 | 2 | 1 |
| Weight-average molecular weight of copolymer | 150,000 | 1,800,000 | 720,000 | 850,000 | 2,200,000 | 890,000 | 560,000 |
| Glass transition temperature of copolymer (° C.) | −75 | −71 | −74 | −73 | −69 | −71 | −72 |
| Fusion heat of copolymer (J/g) | 0 | 45 | 0 | 0 | 41 | 0 | 4 |
| Amount (g) of organic solvent or polyalkylene glycol compound per 1 g of the copolymer | 1.0 | 0.8 | 0.7 | 0.3 | 0.2 | 0.3 | 0.4 |
| Conductivity of solid electrolyte film (S/cm) 25° C. | $1.0 \times 10^{-2}$ | $5.6 \times 10^{-3}$ | $7.9 \times 10^{-3}$ | $4.4 \times 10^{-3}$ | $3.5 \times 10^{-3}$ | $6.2 \times 10^{-3}$ | $3.9 \times 10^{-3}$ |

TABLE 7-continued

| | Example No. | | |
|---|---|---|---|
| | 50 | 51 | 52 |
| Composition of formed copolymer (% by mol) | | | |
| Ethylene oxide | 80 | 75 | 80 |
| Allyl glycidyl ether | 2 | 3 | 1 |
| Glycidyl methacrylate | | | |
| 3-Glycidoxypropyltrimethoxysilane | | | |
| 2,3-Epoxypropyl-2',3'-epoxy-2'-methyl propyl ether | | | |
| Monomer of the formula (1) | 18 | 22 | 19 |
| Constituting unit of formula (1) | | | |
| Substituent: $R^1$ | —$CH_3$ | —$C_2H_5$ | —$CH_3$ |
| Substituent: $R^2$ | —$CH_3$ | —$CH_3$ | —$CH_3$ |
| Polymerization degree: m | 2 | 2 | 2 |
| Polymerization degree: n | 2 | 1 | 2 |
| Weight-average molecular weight of copolymer | 1,200,000 | 700,000 | 950,000 |
| Glass transition temperature of copolymer (°C.) | −69 | −72 | −72 |
| Fusion heat of copolymer (J/g) | 35 | 1 | 2 |
| Amount (g) of organic solvent or polyalkylene glycol compound per 1 g of the copolymer | 0.5 | 1.0 | 1.0 |
| Conductivity of solid electrolyte film (S/cm) 25°C. | $3.0 \times 10^{-3}$ | $5.3 \times 10^{-3}$ | $4.5 \times 10^{-3}$ |

TABLE 8

| | Comparative example | | | |
|---|---|---|---|---|
| | 9 | 10 | 11 | 12 |
| Composition of formed copolymer (% by mol) | | | | |
| Ethylene oxide | 100 | | 98 | 58 |
| Allyl glycidyl ether | | | 2 | 3 |
| Epichlorohydrin | | | | 39 |
| Monomer of formula (1) | | 100 | | |
| Constituting unit of formula (1) | | | | |
| Substituent: $R^1$ | | —$C_2H_5$ | | |
| Substituent: $R^2$ | | —$CH_3$ | | |
| Polymerization degree: m | | 1 | | |
| Polymerization degree: n | | 2 | | |
| Number-average molecular weight of copolymer | 1,200,000 | 100,000 | 950,000 | 220,000 |
| Glass transition temperature of copolymer (° C.) | −59 | −74 | −62 | −49 |
| Fusion heat of copolymer (J/g) | 168 | 0 | 153 | 0 |
| Amount (g) of organic solvent or polyalkylene glycol compound per 1 g of the copolymer | 0.2 | 0.2 | 0.2 | 0.6 |
| Conductivity of solid electrolyte film (S/cm) 25° C. | $9.1 \times 10^{-5}$ | impossible to form | $1.3 \times 10^{-4}$ | $1.6 \times 10^{-6}$ |

Note) Monomer of the formula (1)

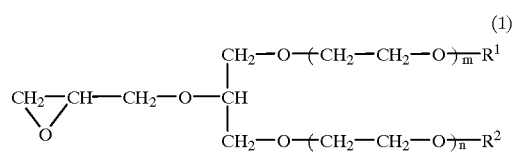

(1)

EXAMPLE 54

Using ethylene oxide (98% by mol) and the monomer of the formula (1) (wherein $R^1$ and $R^2$ represented methyl groups, and m and n were 2)(2% by mol), a copolymerization was conducted by using the same catalyst and operation as in Example 1. The composition of the resulting copolymer had ethylene oxide (99% by mol) and a monomer of the formula (1) (1% by mol). In the copolymer, the weight-average molecular weight was 1,200,000, the glass transition temperature was −69° C. and the fusion heat was 98 J/g.

A film was formed from the resulting copolymer in the same manner as that obtained in Example 13. At that time, a mol ratio of added LiTFSI was adjusted so that a molar ratio of (the number of moles of LiTFSI) to (the total number of moles of ether oxygen atoms of the copolymer) was 0.05. The conductivity of the solid electrolyte film was $1.1 \times 10^{-4}$ S/cm at 25° C.

EFFECT OF THE INVENTION

The solid polymer electrolyte of the present invention is superior in processability, moldability, mechanical strength, flexibility, heat resistance and the like, and the ionic conductivity is remarkably improved. Accordingly, an application to electronic apparatuses such as large-capacity condenser and display device (e.g. an electrochromic display) in addition to solid batteries (particularly secondary batteries), and an application to antistatic agent or antistatic material for rubber and plastic materials are expected.

What is claimed is:

1. A polyether copolymer having a weight-average molecular weight of $10^3$ to $10^7$, which is optionally crosslinked, comprising:

(A) 0.5 to 99% by mol of a repeating unit derived from a monomer represented by the formula (I):

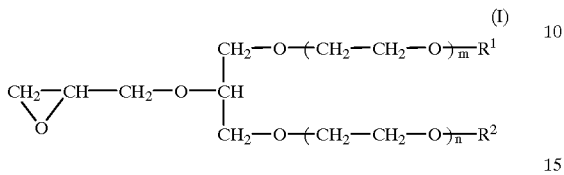

(I)

wherein each of $R^1$ and $R^2$ represents a group selected from an alkyl group having 1 to 12 carbon atoms, an alkenyl group having 2 to 8 carbon atoms, a cycloalkyl group having 3 to 8 carbon atoms, an aryl group having 6 to 14 carbon atoms, an aralkyl group having 7 to 12 carbon atoms and a tetrahydropyranyl group; and each of m and n represents numeral of 1 to 12;

(B) 99.5 to 1% by mol of a repeating unit derived from a monomer represented by the formula (II):

(II)

(C) 0 to 15% by mol of a repeating unit derived from a monomer having one epoxy group and at least one reactive functional group.

2. The polyether copolymer according to claim 1, wherein the glass transition temperature measured by a differential scanning calorimeter (DSC) is not more than −60° C. and the fusion heat is not more than 90 J/g.

3. The polyether copolymer according to claim 1, wherein the reactive functional group in the repeating unit (C) is (a) a reactive silicon group, (b) an epoxy group, (c) an ethylenically unsaturated group or (d) a halogen atom.

4. The polyether copolymer according to claim 1, wherein the repeating unit (C) is derived from a monomer of the formula (III-1) or (III-2):

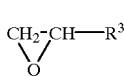

(III-1)

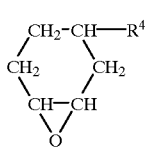

(III-2)

wherein $R^3$ and $R^4$ represent a group having a reactive functional group.

5. The polyether copolymer according to claim 1, wherein the monomer having a reactive silicon group, which constitutes the repeating unit (C), is represented by the formula (III-a-1-1), (III-a-1-2) or (III-a-2-1):

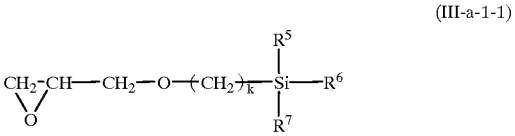

(III-a-1-1)

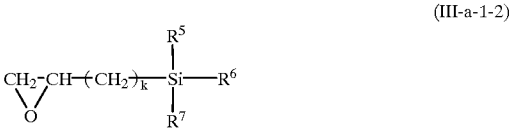

(III-a-1-2)

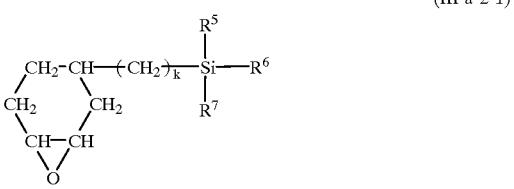

(III-a-2-1)

wherein $R^5$, $R^6$ and $R^7$ may be the same or different, but at least one of them represents an alkoxy group and the remainder represent an alkyl group; and k represents 1 to 6.

6. The polyether copolymer according to claim 1, wherein the monomer having a reactive silicon group, which constitutes the repeating unit (C), is 3-glycidoxypropyltrimethoxysilane, 3-glycidoxypropylmethyldimethoxysilane, 4-(1,2-epoxy)butyltrimethoxysilane, 5-(1,2-epoxy)pentyltrimethoxysilane or 2-(3,4-epoxycyclohexyl)ethyltrimethoxysilane.

7. The polyether copolymer according to claim 1, wherein the monomer having two epoxy groups, which constitutes the repeating unit (C), is represented by the formula (III-b):

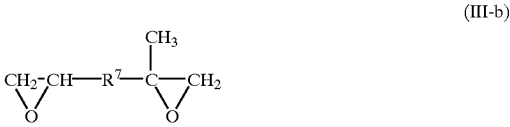

(III-b)

wherein $R^7$ is a divalent organic group.

8. The polyether copolymer according to claim 7, wherein the group $R^7$ in the formula (III-b) is

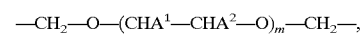

—$CH_2$—O—$(CHA^1$—$CHA^2$—O$)_m$—$CH_2$—,

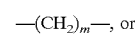

—$(CH_2)_m$—, or

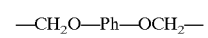

—$CH_2$O—Ph—O$CH_2$— wherein $A^1$ and $A^2$ represent hydrogen or a methyl group; Ph represents a phenylene group; and m represents a numeral of 0 to 12.

9. The polyether copolymer according to claim 1, wherein the monomer having two epoxy groups, which constitutes the repeating unit (C), is 2,3-epoxypropyl-2',3'-epoxy-2'-methyl propyl ether or ethylene glycol-2,3-epoxypropyl-2', 3'-epoxy-2'-methyl propyl ether.

10. The polyether copolymer according to claim 1, wherein the monomer having an ethylenically unsaturated group, which constitutes the repeating unit (C), is represented by the formula (III-c):

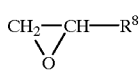

(III-c)

wherein R⁸ is a group having an ethylenically unsaturated group.

11. The polyether copolymer according to claim 1, wherein the monomer having an ethylenically unsaturated group, which constitutes the repeating unit (C), is allyl glycidyl ether, 4-vinylcyclohexyl glycidyl ether, α-terpinyl glycidyl ether, cyclohexenylmethyl glycidyl ether, p-vinylbenzyl glycidyl ether, allylphenyl glycidyl ether, vinyl glycidyl ether, 3,4-epoxy-1-butene, 3,4-epoxy-1-pentene, 4,5-epoxy-2-pentene, 1,2-epoxy-5,9-cyclododecadiene, 3,4-epoxy-1-vinylcyclohexene, 1,2-epoxy-5-cyclooctene, glycidyl acrylate, glycidyl methacrylate, glycidyl sorbate, glycidyl cinnamate, glycidyl crotonate, glycidyl-4-hexenoate, oligoethylene glycol glycidyl ether acrylate having 1 to 12 oxyethylene chains, oligoethylene glycol glycidyl ether methacrylate having 1 to 12 oxyethylene chains, oligoethylene glycol allyl glycidyl ether having 1 to 12 oxyethylene chains or

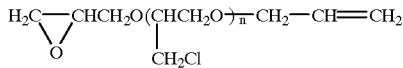

(n = 1 to 12).

12. The polyether copolymer according to claim 1, wherein the monomer having a halogen atom, which constitutes the repeating unit (C), is represented by the formula (III-d):

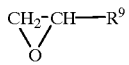

(III-d)

wherein R⁹ is a group having at least one halogen atom.

13. The polyether copolymer according to claim 1, wherein the monomer having a halogen atom is

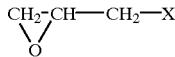

wherein X represents a bromine atom (Br) or an iodine atom (I).

14. The polyether copolymer according to claim 1, wherein the polyether copolymer comprises 10 to 95% by mol of the repeating unit (A), 90 to 5% by mol of the repeating unit (B) and 0 to 10% by mol of the repeating unit (C).

15. A solid polymer electrolyte comprising:
(1) the polyether copolymer of claim 1;
(2) an electrolyte salt compound; and
(3) if necessary, a plasticizer selected from the group consisting of an aprotic organic solvent, and a derivative or a metal salt of a linear or branched polyalkylene glycol having a number-average molecular weight of 200 to 5,000 or a metal salt of the derivative.

16. The solid polymer electrolyte according to claim 15, wherein the electrolyte salt compound (2) is a compound comprising a cation selected from a metal cation, an ammonium ion, an amidinium ion and a guanidium ion, and an anion selected from a chloride ion, a bromide ion, a iodide ion, a perchlorate ion, a thiocyanate ion, a tetrafluoroborate ion, a nitrate ion, $AsF_6^-$, $PF_6^-$, a stearylsulfonate ion, an octylsulfonate ion, a dodecylbenzenesulfonate ion, a naphthalenesufonate ion, a dodecylnaphthalenesulfonate ion, a 7,7,8,8-tetracyano-p-quinodimethane ion, $X^1SO_3^-$, $[(X^1SO_2)(X^2SO_2)N]^-$, $[(X^1SO_2)(X^2SO_2)(X^3SO_2)C]^-$ and $[(X^1SO_2)(X^2SO_2)YC]^-$ (wherein $X^1$, $X^2$, $X^3$ and Y respectively represent an electron attractive group).

17. The solid polymer electrolyte according to claim 16, wherein $X^1$, $X^2$ and $X^3$ independently represent a perfluoroalkyl or perfluoroaryl group having 1 to 6 carbon atoms and Y represents a nitro group, a nitroso group, a carbonyl group, a carboxyl group or a cyano group.

18. The solid polymer electrolyte according to claim 16, wherein the metal cation is a cation of a metal selected from Li, Na, K, Rb, Cs, Mg, Ca and Ba.

19. The solid polymer electrolyte according to claim 16, wherein the metal cation is a cation of a transition metal.

20. The solid polymer electrolyte according to claim 16, wherein the metal cation is a cation of a metal selected from Mn, Fe, Co, Ni, Cu, Zn and Ag.

21. The solid polymer electrolyte according to claim 15, wherein the formulation ratio of the electrolyte salt compound to the polyether copolymer is so that a value of a molar ratio of the number of moles of the electrolyte salt compound to the total number of moles of oxyethylene units in the copolymer is from 0.0001 to 5.

22. The solid polymer electrolyte according to claim 15, wherein the aprotic organic solvent is an aprotic organic solvent selected from ethers or esters.

23. The solid polymer electrolyte according to claim 15, wherein the aprotic organic solvent is an organic solvent selected from propylene carbonate, γ-butyrolactone, butylene carbonate and 3-methyl-2-oxazolidone.

24. The solid polymer electrolyte according to claim 15, wherein the aprotic organic solvent is an organic solvent selected from triethylene glycol dimethyl ether, triethylene glycol diethyl ether, tetraethylene glycol dimethyl ether and tetraethylene glycol diethyl ether.

25. The solid polymer electrolyte according to claim 15, wherein the number-average molecular weight of the polyalkylene glycol is from 200 to 2,000.

26. The solid polymer electrolyte according to claim 15, wherein the polyalkylene glycol is polyethylene glycol or polypropylene glycol.

27. The solid polymer electrolyte according to claim 15, wherein the derivative of the polyalkylene glycol is an ether derivative or an ester derivative.

28. The solid polymer electrolyte according to claim 27, wherein the ether derivative of the polyalkylene glycol is any one of polyethylene glycol dimethyl ether, polyethylene glycol diethyl ether and polyethylene glycol diallyl ether.

29. The solid polymer electrolyte according to claim 27, wherein the ester derivative of the polyalkylene glycol is any one of polyethylene glycol dimethacrylate ester, polyethylene glycol diacrylate ester and polyethylene glycol diacetate ester.

30. The solid polymer electrolyte according to claim 15, wherein the metal salt of the polyalkylene glycol is any one of a sodium salt, a lithium salt and a dialkylaluminum salt.

31. The solid polymer electrolyte according to claim 15, wherein the metal salt of the polyalkylene glycol is any one of a lithium salt of polyethylene glycol and a dialkylaluminum salt of polyethylene glycol.

32. The solid polymer electrolyte according to claim 15, wherein the metal salt of the polyalkylene glycol derivative is any one of a lithium salt of polyethylene glycol monomethyl ether, a lithium salt of polyethylene glycol monoethyl ether and a lithium salt of polyethylene glycol monoallyl ether.

33. The solid polymer electrolyte according to claim 15, wherein the metal salt of the polyalkylene glycol derivative is any one of a dioctylaluminum salt of polyethylene glycol monomethyl ether, a dioctylaluminum salt of polyethylene glycol monoethyl ether and a dioctylaluminum salt of polyethylene glycol monoallyl ether.

34. The solid polymer electrolyte according to claim 15, wherein the amount of the plasticizer is from 1 to 2,000 parts by weight based on 100 parts by weight of the polyether copolymer.

35. A battery comprising the solid polymer electrolyte of claim 1, a positive electrode and a negative electrode.

* * * * *